United States Patent
Pan et al.

(10) Patent No.: US 12,504,873 B2
(45) Date of Patent: *Dec. 23, 2025

(54) METHOD AND APPARATUS FOR CONTROLLING VIRTUAL OBJECT TO DROP VIRTUAL ITEM AND MEDIUM

(71) Applicant: Tencent Technology (Shenzhen) Company Limited, Shenzhen (CN)

(72) Inventors: Jiaqi Pan, Shenzhen (CN); Meng Qiu, Shenzhen (CN); Shuting Zhang, Shenzhen (CN); Weijian Cui, Shenzhen (CN); Cong Tian, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 48 days.

This patent is subject to a terminal disclaimer.

(21) Appl. No.: 18/133,310

(22) Filed: Apr. 11, 2023

(65) Prior Publication Data
US 2023/0244373 A1   Aug. 3, 2023

Related U.S. Application Data

(63) Continuation of application No. 17/332,864, filed on May 27, 2021, now Pat. No. 11,656,755, which is a (Continued)

(30) Foreign Application Priority Data

Jun. 5, 2019   (CN) .......................... 201910488333.6

(51) Int. Cl.
*G06F 3/0486*   (2013.01)
*A63F 13/55*   (2014.01)
(Continued)

(52) U.S. Cl.
CPC ............ *G06F 3/0486* (2013.01); *A63F 13/55* (2014.09); *G06F 3/04812* (2013.01); *G06F 3/04817* (2013.01); *G06F 3/04842* (2013.01)

(58) Field of Classification Search
CPC .... G06F 3/048; G06F 3/0486; G06F 3/04842; G06F 3/04812; G06F 3/04817; A63F 13/55–58
See application file for complete search history.

(56) References Cited

U.S. PATENT DOCUMENTS

| 11,656,755 B2 | 5/2023 | Pan et al. |
| 2004/0229695 A1 | 11/2004 | Hussaini et al. |

(Continued)

FOREIGN PATENT DOCUMENTS

| CN | 105204732 A | 12/2015 |
| CN | 107551554 A | 1/2018 |

(Continued)

OTHER PUBLICATIONS

Jayanam. Unity Inventory Tutorial: Drop Items. Youtube. Jan. 7, 2018. <https://www.youtube.com/watch?v=db6ofSbAXnE&list=PLboXykqtm8dynMisqs4_oKvAlZedixvtf&index=5> (Year: 2018).*

(Continued)

*Primary Examiner* — Liang Y Li
(74) *Attorney, Agent, or Firm* — Morgan, Lewis & Bockius LLP

(57) ABSTRACT

This application discloses a method for controlling a virtual object to drop a virtual item in a virtual environment performed at a terminal. The method includes: displaying a user interface, the user interface including an icon corresponding to at least one type of virtual items possessed by a virtual object and a partial-drop region; receiving a first drag operation of dragging target virtual items from the icon corresponding to the at least one type of virtual items to the (Continued)

partial-drop region; dropping a fixed number of target virtual items in response to release of the first drag operation at a first location within the partial-drop region; and dropping a user-customized number of target virtual items in response to release of the first drag operation at a second location within the partial-drop region.

20 Claims, 12 Drawing Sheets

Related U.S. Application Data continuation of application No. PCT/CN2020/092277, filed on May 26, 2020.

(51) Int. Cl.
*G06F 3/04812* (2022.01)
*G06F 3/04817* (2022.01)
*G06F 3/04842* (2022.01)

(56) References Cited

U.S. PATENT DOCUMENTS

| | | | |
|---|---|---|---|
| 2005/0026695 A1 | 2/2005 | Tsuchiyama et al. | |
| 2005/0166159 A1 | 7/2005 | Mondry et al. | |
| 2007/0150834 A1 | 6/2007 | Muller et al. | |
| 2007/0173334 A1 | 7/2007 | Whitby et al. | |
| 2007/0265081 A1 | 11/2007 | Shimura et al. | |
| 2010/0144443 A1 | 6/2010 | Graham et al. | |
| 2010/0210333 A1 | 8/2010 | Halash | |
| 2011/0265041 A1* | 10/2011 | Ganetakos | A63F 13/533 715/834 |
| 2013/0132878 A1* | 5/2013 | Tijssen | G06F 3/0488 715/769 |
| 2013/0290884 A1 | 10/2013 | Sotoike | |
| 2014/0279415 A1* | 9/2014 | Hazam | G06Q 20/10 705/39 |
| 2015/0206105 A1* | 7/2015 | Suzukake | G06Q 20/0655 705/39 |
| 2016/0048285 A1* | 2/2016 | Jwa | G06F 3/0486 715/769 |
| 2017/0340977 A1 | 11/2017 | Guthridge et al. | |
| 2018/0107372 A1* | 4/2018 | Van Damme | G06F 3/04883 |
| 2018/0369692 A1 | 12/2018 | Winick | |

FOREIGN PATENT DOCUMENTS

| | | | | |
|---|---|---|---|---|
| CN | 108459811 A | | 8/2018 | |
| CN | 110201403 A | | 9/2019 | |
| CN | 108459811 B | * | 3/2021 | A63F 13/52 |
| EP | 3922331 A1 | | 3/2022 | |
| JP | 2016168282 A | | 9/2016 | |
| JP | 2017018464 A | | 1/2017 | |
| JP | 2019048002 A | | 3/2019 | |
| WO | WO 2020244415 A1 | | 12/2020 | |

OTHER PUBLICATIONS

Tencent Technology, Japanese Office Action, JP Application No. 2021-541110, May 16, 2023, 11 pgs.
Apex Legends Strategy Team, "How to Give (Throw Away) Items", Game8, Apex Legends Wiki, Mar. 31, 2019, 6 pgs., Retrieved from the Internet: https://web.archive.org/web/20190331193126/https://game8.jp/apex-legends/257815.
Baidu, "How to Choose the Number of Lost Items to Stimulate the Battlefield", Feb. 28, 2018, pgs., Retrieved from the Internet: https://jingvan.baidu.com/article/1974b2895cf980f4b0f7747b.html.
Happy With You, "How to Enchant Other People's Equipment in World of Warcraft? Can the Equipment Already be Enchanted?", Sogou, Jan. 11, 2010, 2 pgs., Retrieved from the Internet: https://wenwen.sogou.com/z/q174207640.htm.
Ichidori's Room, "How to Drop Items and Pass Them to Other Players [Fortnite]", Nov. 3, 2017, 12 pgs., Retrieved from the Internet: https://torik0419.com/2017/11/03/fortnite-%E6%AD%A6%E5%99%A8-%E8%90%BD%E3%81%A8%E3%81%99/.
Jayanam, "Unity Inventory Tutorial: Drop Items", Youtube.com, Ja. 7, 2018, 2 pgs., Retrieved from the Internet: www.youtube.com/watch?v=db6ofSbA.XnE&list=PLboXykqtm8dynMisqs4_oKyAIZedixytf&index=5.
Skwir123, "TIL Manually Insert Fuel 1-at-a-time with 'Z'", Reddit, May 23, 2019, 6 pgs., Retrieved from the Internet: https://www.reddit.com/r/factorio/comments/bs2yzz/til_manually_insert_fuel_1atatime_with_z/.
Tencent Technology, Australian Office Action, AU Patent Application No. 2020287683, Aug. 31, 2022, 3 pgs.
Tencent Technology, Australian Office Action, AU Patent Application No. 2020287683, Jan. 18, 2023, 5 pgs.
Tencent Technology, Canadian Office Action, CA Patent Application No. 3,132,899, Dec. 2, 2022, 7 pgs.
Tencent Technology, ISRWO, PCT/CN2020/092277, Aug. 26, 2020, 6 pgs.
Tencent Technology, IPRP, PCT/CN2020/092277, Dec. 7, 2021, 5 pgs.
Tencent Technology, Japanese Office Action, JP Patent Application No. 2021-541110, Sep. 27, 2022, 10 pgs.
Tencent Technology, Singaporean Office Action, SG Patent Application No. 11202109732T, Nov. 28, 2022, 5 pgs.
Wayback Machine, "Fortnite: Patch Notes 1.7.1, Added Place Names to Battle Royale Mode Maps, Changed Weapon Names and Damage, Changed Kill Count Mechanism During Team Battles, Etc.", Nov. 20, 2017, 11 pgs., Retrieved from the Internet: https://web.archive.org/web/20171120010824/https://fpsjp.net/archives/292746.
Fortnite KR, "Fundamentals Guide—All About Game UI", Internet YouTube posted video, Oct. 30, 2018, 2 pgs., Retrieved from the Internet: https://www.youtube.com/watch?v=ZcQVC4L63vs.
"Mobile Terraria Strategy 01—Start," Internet Naver Blog, Mar. 11, 2017, 23 pgs., Retrieved from the Internet: https://blog.naver.com/PostView.nhn?blogId=kih14326&logNo=220955777150.
Tencent Technology, Korean Office Action, KR Patent Application No. 10-2021-7032065, Aug. 3, 2023, 14 pgs.
Tencent Technology (Shenzhen) Company Limited, Canadian Office Action, Patent Application No. CA 3,132,899, Sep. 5, 2023, 5 pgs.
Tencent Technology, European Office Action, EP Patent Application No. 20819115.5 Mar. 22, 2024, 5 pgs.
Tencent Technology, Canadian Office Action, CA Patent Application No. 3,132,899, Sep. 11, 2024, 5 pgs.
Tencent Technology, United Arab Emirates Office Action, AE Patent Application No. P6002199/2021, Aug. 1, 2024, 6 pgs.
Tencent Technology, Brazilian Office Action, BR Patent Application No. BR112021018289-6, Dec. 11, 2024, 5 pgs.
Tencent Technology, Singaporean Office Action, SG Patent Application No. 11202109732T, Dec. 12, 2024, 3 pgs.

* cited by examiner

METHOD AND APPARATUS FOR CONTROLLING VIRTUAL OBJECT TO DROP VIRTUAL ITEM AND MEDIUM

CROSS-REFERENCE TO RELATED APPLICATIONS

This application is a continuation application of U.S. patent application Ser. No. 17/332,864, entitled "METHOD AND APPARATUS FOR CONTROLLING VIRTUAL OBJECT TO DISCARD VIRTUAL ITEM, AND MEDIUM" filed on May 27, 2021, which is a continuation application of PCT Patent Application No. PCT/CN2020/092277, entitled "METHOD AND APPARATUS FOR CONTROLLING VIRTUAL OBJECT TO DISCARD VIRTUAL ITEM, AND MEDIUM" filed on May 26, 2020, which claims priority to Chinese Patent Application No. 201910488333.6, filed with the State Intellectual Property Office of the People's Republic of China on Jun. 5, 2019, and entitled "METHOD AND APPARATUS FOR CONTROLLING VIRTUAL OBJECT TO DROP VIRTUAL ITEM AND MEDIUM", all of which are incorporated herein by reference in their entirety.

FIELD OF THE TECHNOLOGY

This application relates to the field of computers, and in particular, to a method and an apparatus for controlling a virtual object to drop a virtual item and a medium.

BACKGROUND OF THE DISCLOSURE

In an application based on a three-dimensional virtual environment, for example, a battle royale shooting game, a user may control a virtual object in a virtual environment to walk, run, shoot, fight, drive and perform other actions, and a plurality of users may team up online to complete a task in the same virtual environment. The user may control the virtual object to pick up a virtual item in the virtual environment or may control the virtual object to drop a carried virtual item or an equipped virtual item in the virtual environment.

The user may drop virtual items in an inventory. The user may open the inventory, select a target virtual item, set a drop quantity, and click/tap a virtual drop button to complete the dropping of the target virtual item.

The foregoing steps of dropping a virtual item is relatively complex. As a result, operations of dropping a particular quantity of target virtual items cannot be completed quickly.

SUMMARY

Embodiments of this application provide a method and an apparatus for controlling a virtual object to drop a virtual item and a medium, to simplify operation steps of dropping some of virtual items, thereby improving the efficiency of man-machine interaction. The technical solutions are as follows.

According to an aspect of this application, a method for controlling a virtual object to drop a virtual item is provided and is applicable to a terminal. The method includes:
displaying an icon corresponding to at least one type of virtual items possessed by a virtual object and a partial-drop region;
receiving a first drag operation, the first drag operation being used for dragging target virtual items from the icon corresponding to the at least one type of virtual items to the partial-drop region, a possession quantity corresponding to the target virtual items being n, n being an integer greater than 1; and
controlling the virtual object according to the first drag operation to drop a predefined number of the n target virtual items.

According to another aspect of this application, an apparatus for controlling a virtual object to drop a virtual item is provided. The apparatus includes:
a display module, configured to display an icon corresponding to at least one type of virtual items possessed by a virtual object and a partial-drop region;
a receiving module, configured to receive a first drag operation, the first drag operation being used for dragging target virtual items from the icon corresponding to the at least one type of virtual items to the partial-drop region, a possession quantity corresponding to the target virtual items being n, n being an integer greater than 1; and
a processing module, configured to control the virtual object according to the first drag operation to drop a predefined number of the n target virtual items.

According to another aspect of this application, a terminal is provided, and includes a processor and a memory, the memory storing at least one instruction, at least one program, a code set or an instruction set, the at least one instruction, the at least one program, the code set or the instruction set being loaded and executed by the processor to implement the method for controlling a virtual object to drop a virtual item according to the foregoing aspects.

According to another aspect of this application, a non-transitory computer-readable storage medium is provided, the storage medium storing at least one instruction, at least one program, a code set or an instruction set, the at least one instruction, the at least one program, the code set or the instruction set being loaded and executed by a processor to implement the method for controlling a virtual object to drop a virtual item according to the foregoing aspects.

Beneficial effects brought by the technical solutions provided in the embodiments of this application are at least as follows:

When a plurality of users team up online to complete a task in the same virtual environment, at least two user-controlled virtual objects need target virtual items. Any user in the team may divide and then drop the target virtual items through an operation of dragging the target virtual items to a partial-drop region. The user may set a drop quantity of the target virtual items, which simplifies the operation steps of dropping the target virtual items, so that users who need the target virtual items can obtain the target virtual items in time.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

Figure 1A:
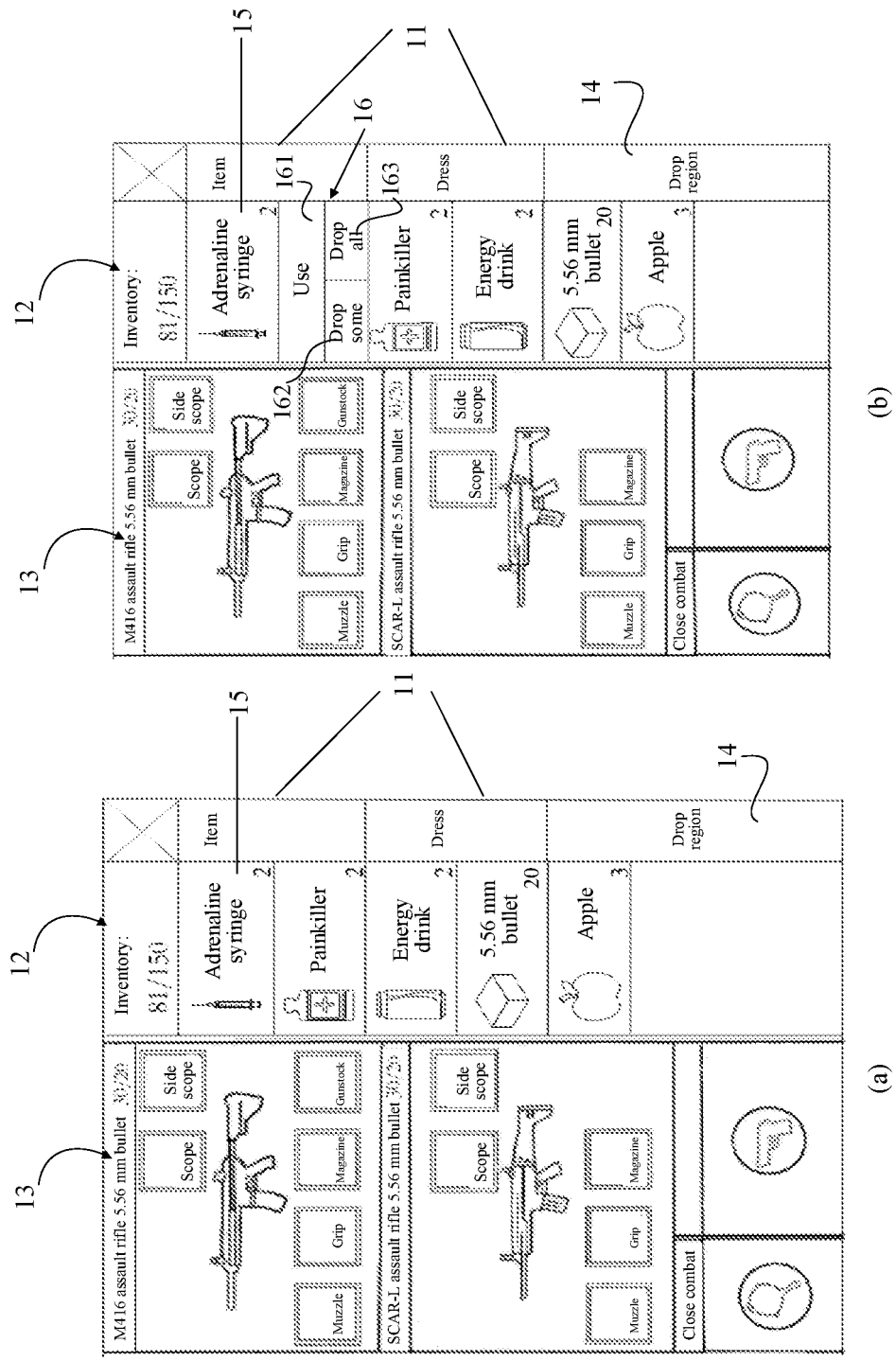
FIGS. 1A and 1B are schematic interface diagrams of dropping some of virtual items in the related art according to an exemplary embodiment of this application.

To make the objectives, technical solutions, and advantages of this application clearer, the following further describes implementations of this application in detail with reference to the accompanying drawings.

First, terms involved in the embodiments of this application are introduced:

A virtual environment is a virtual environment displayed (or provided) by an application when run on a terminal. The virtual environment may be a simulated environment of a real world, or may be a semi-simulated semi-fictional environment, or may be an entirely fictional environment. The virtual environment may be any one of a two-dimensional virtual environment, a 2.5-dimensional virtual environment, and a three-dimensional virtual environment. This is not limited in this application. Description is made by using an example in which the virtual environment is a three-dimensional virtual environment in the following embodiments.

A virtual object is a movable object in the virtual environment. The movable object may be a virtual person, a virtual animal, a cartoon person, or the like, such as a person, an animal, a plant, an oil drum, a wall, a stone, or the like displayed in a three-dimensional virtual environment. In some embodiments, the virtual object is a three-dimensional model created based on a skeletal animation technology. Each virtual object has a respective shape and size in the three-dimensional virtual environment, and occupies some space in the three-dimensional virtual environment.

A virtual item is an item equipped or carried on a virtual object, and is, for example, at least one of food, medicine, weapons, tools or clothes. The effects of the virtual items on the virtual object include: at least one of increasing the strength of the virtual object in the virtual environment, extending the life of the virtual object, increasing the defense of the virtual object, and boosting the damage of the virtual object, or the virtual object fighting with the virtual items, replenishing ammunition, equipping a scope, or protecting and beautifying the virtual object with the virtual items.

A target virtual item is a to-be-dropped virtual item selected by a user in this application.

In this application, "drop" refers to removing a target virtual item from a virtual item list. The target virtual item is moved to the virtual environment for a virtual object controlled by another user to pick up in the virtual environment.

In this application, "carry or equip" refers to virtual items possessed by the virtual object. The virtual object owns an inventory, and the inventory has an inventory grid. When the virtual object puts a virtual item picked in the virtual environment into the inventory grid in the inventory, the virtual object carries or is equipped with the virtual item. Virtual items held by the virtual object and virtual items used for additional appearance (for example, clothes) of the virtual object are also virtual items carried or equipped on the virtual object.

The method provided in this application may be applied to a virtual reality application, a three-dimensional map program, a military simulation program, a first-person shooting game (FPS), a multiplayer online battle arena game (MOBA), a battle royale shooting game, or the like. The following embodiments are described based on an application scenario in a game as an example.

A game based on a virtual environment usually includes a map of one or more game worlds. A user may control a virtual object in the game to shoot, fight, drive and perform other actions in the virtual environment and experience strong interaction. A plurality of users may team up online to play a competitive game. The virtual environment in the game is created by simulating a real-world scene, and a health bar is simulated as the life of the virtual object in the game. When the virtual object in the game is injured (for example, hit by a bullet), the health bar corresponding to the injured virtual object decreases. The health bar decreases to different degrees for different degrees of damage. When the health bar is empty, the life corresponding to the virtual object in the game ends, and the user who controls the virtual object can no longer continue to play the game.

The virtual object in the game carries an inventory, and there is game equipment such as food, weapons, medicine, and clothes in the inventory. The virtual object may use the game equipment according to a virtual environment in the game. For example, when the virtual object is hit by a bullet, medicine may be used to increase the health bar. In an interface of the opened inventory, a virtual use button, a virtual partial-drop button, and a virtual drop-all button appear when medicine is clicked/taped. The user clicks/taps the virtual use button to use the medicine, clicks/taps the virtual partial-drop button to drop a particular quantity of the medicine in the virtual environment, and clicks/taps the virtual drop-all button to drop all the medicine in the inventory in the virtual environment.

In a case of dropping some of target virtual items, the user performs the following steps: clicking/tapping the virtual partial-drop button. An interface of the opened inventory displays a dialog box through which a drop quantity can be set. The dialog box includes: a virtual quantity-increase button, a virtual quantity-decrease button, a slider, a drop quantity, a virtual drop button, and a virtual cancel button. The user sets a drop quantity of the target virtual items by using a virtual quantity-control button or dragging the slider. After setting the drop quantity of the target virtual items, the user clicks/taps the virtual drop button, so that the target virtual items are dropped in the virtual environment according to the drop quantity set by the user.

In a case of teaming up, if a teammate needs the help with a virtual item (for example, the teammate has lost too much blood and needs a first-aid kit to extend the life in the game), another teammate needs to divide some virtual items from existing virtual items to assist the teammate (for example, divide two first-aid kits into two shares, each share having one first-aid kit). In this case, the user clicks/taps a virtual item (such as a first-aid kit) that needs to be divided in the inventory, clicks/taps a partial-drop button, and selects a drop quantity, so that a selected virtual item can be dropped. When more than two teammates need the help with a virtual item, the foregoing steps are repeated for the teammates who need help. The operations are complex and an opportunity to rescue the teammates tends to be missed.

Figure 1B:
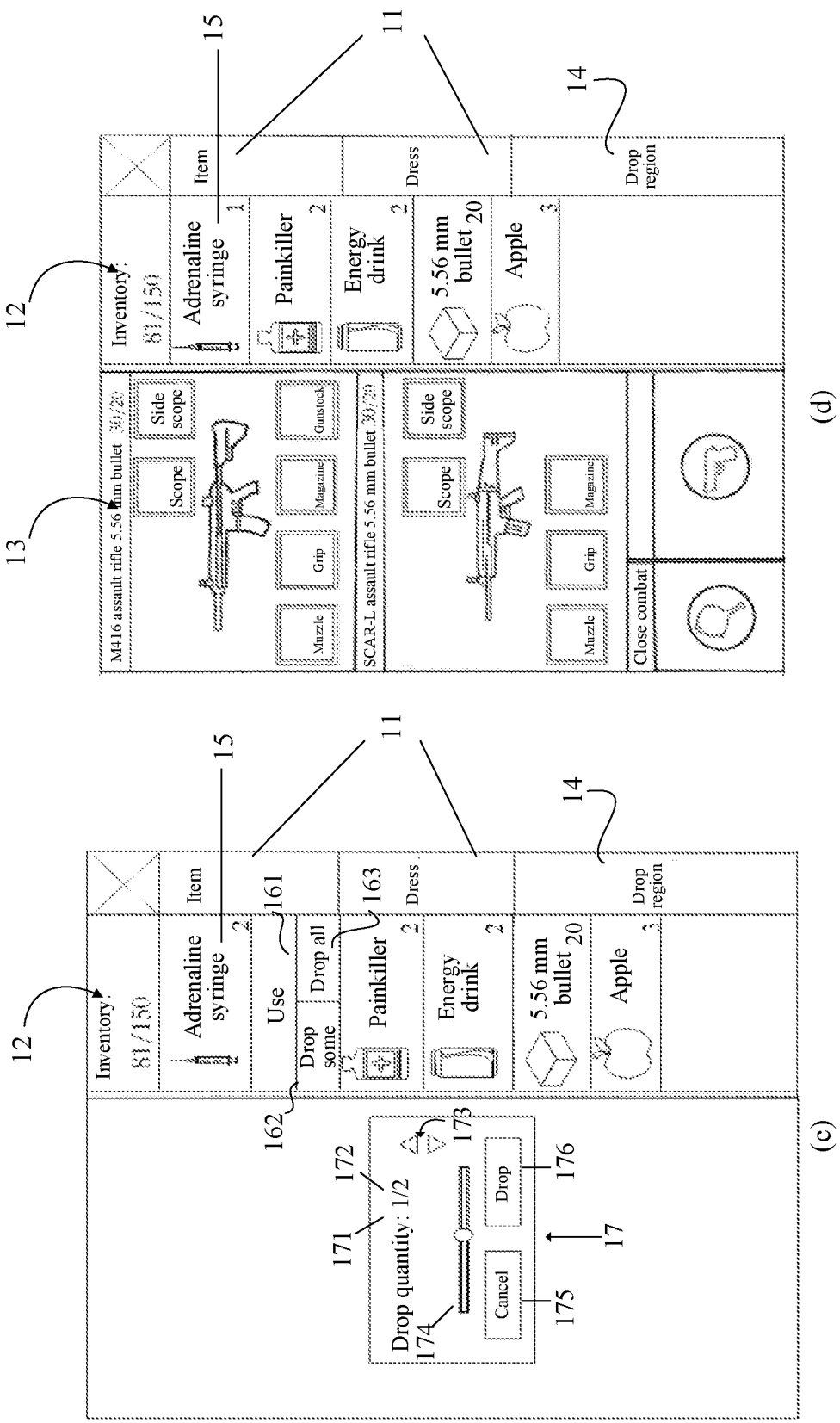

In the related art, a method for controlling a virtual object to drop some of virtual items is provided. FIGS. 1A and 1B show interfaces of an application displayed when some of virtual items are dropped in the related art. As shown in (a) in FIG. 1A, the interface includes a virtual item classification region 11, a virtual item list 12, a virtual item equipment list 13, a drop region 14, and a virtual item 15. In an example in which some of virtual items of a medicine type are dropped, for example, a virtual item 15 named "adrenaline syringe", a user clicks/taps a bar in which the adrenaline syringe is located, and a new status bar 16 then appears below the bar. As shown in (b) in FIG. 1A, the status bar includes: a virtual use button 161, a virtual partial-drop button 162, and a virtual drop-all button 163. The user clicks/taps the partial-drop button 162, so that a new status bar 17 appears. As shown in (c) in FIG. 1B, a quantity 171 of to-be-dropped target virtual items, a possession quantity 172 of target virtual items, a drop-quantity control button 173, a drop-quantity control slider 174, a cancel button 175, and a drop button 176 are displayed in the status bar. The user sets a quantity of to-be-dropped target virtual items first, for example, sets a quantity of adrenaline syringes in the virtual item list to 2, and sets a quantity of to-be-dropped adrenaline syringes to 1. After the quantity of to-be-dropped target virtual items is set, the user clicks/taps the virtual drop button 176, so that as shown in (d) in FIG. 1B, the quantity of adrenaline syringes in the virtual item list is 1. After the foregoing operation, a terminal controls a virtual object to drop one adrenaline syringe into a virtual environment. In a case of teaming up, if at least two teammates need a virtual item, the user needs to repeat the steps at least twice to divide and drop the target virtual items. The operations are complex and an opportunity to rescue the teammates tends to be missed.

Figure 2:
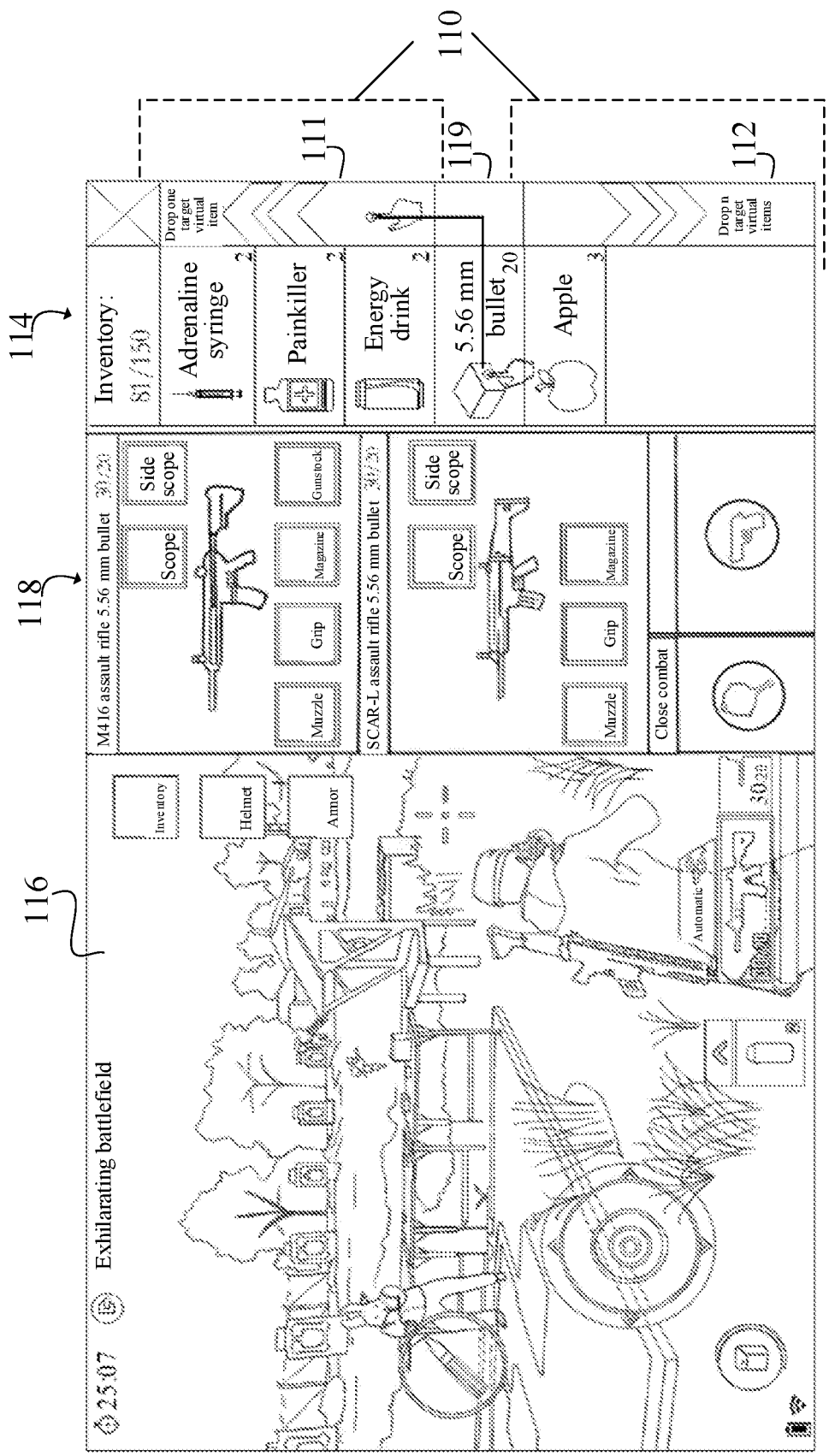
FIG. 2 is a schematic interface diagram of an application for controlling a virtual object to drop a virtual item according to an exemplary embodiment of this application.

This application provides a method for controlling a virtual object to drop a virtual item. In an example implemented based on a game, the method is described with reference to an interface of an application. FIG. 2 is a schematic interface diagram of an application to which a method for controlling a virtual object to drop a virtual item is applied. A first drop region 111, a second drop region 112, target virtual items 113, a virtual item list 114, a virtual object 115, a virtual environment 116, another virtual object 117 (for example, the another virtual object may be a teammate in a team formed in a manner in which the user teams up with a virtual object controlled by a terminal of another user) in the virtual environment 116, an equipment list 118, and a third drop region 119 (a drop region used for dropping all target virtual items 113, that is, a drop-all region) are displayed on the interface. In some embodiments, a virtual item equipped on the virtual object 115 may be at least one of a virtual item of a weapon type or an item of an accessory type. In some embodiments, the item of a weapon type may be a weapon such as a gun, a landmine, a grenade, a bow and arrows, a pan for close combat, a dagger, or a sword. The item of an accessory type may be an accessory such as a magazine, a gunstock, a muzzle, a grip, or a scope. Schematically, the equipment list in this application is described by using a gun equipped on the virtual object as an example.

The user drags the target virtual items 113 to the partial-drop region 110. In some embodiments, the partial-drop region 110 includes: a first drop region 111 used for dropping a target virtual items and a second drop region 112 used for dropping b target virtual items. In some embodiments, the fixed number may be any integer. That is, the fixed number is a preset fixed parameter or default value of a drop quantity in the application. The value of a varies in different applications, and the user cannot change the value of a. Schematically, descriptions are made by using an example in which when the value of a in the application is 1, the terminal controls the virtual object to drop one target virtual item 113. The user selects the target virtual item 113 in the virtual item list 114, performs a first drag operation on the target virtual item 113, and drags the target virtual item 113 to the first drop region 111. The terminal controls the virtual object 115 according to the first drag operation to drop one target virtual item 113.

In some embodiments, the user-customized number is any integer, and the user customizes the value of b. Schematically, descriptions are made by using an example in which when the value of a in an application is 1, the user customizes the value of b to 2, and the terminal controls the virtual object to drop two target virtual items 113. If the target virtual items 113 are used for helping other virtual objects 117 (for example, the quantity of other virtual objects 117 is 2), the user performs the first drag operation on the target virtual items 113, and drags the target virtual items 113 to the second drop region 112. The terminal controls the virtual object 115 according to the first drag operation to drop the two target virtual items 113 on the ground near the virtual environment 116 for other virtual objects 117 to pick up.

It can be understood that when the default value of a in the application is the same as the value of b customized by the user, the user may drag the target virtual items 113 to the first drop region 111 or the second drop region 112, and the terminal controls the virtual object to drop the target virtual items 113.

In some embodiments, the foregoing drop region further includes the third drop region 119. The drop region is used for dropping all the target virtual items 113. Schematically, the user performs the second drag operation on the target virtual items 113 and drags the target virtual items 113 to the drop region. After receiving the second drag operation, the terminal activates the drop region. In this case, the drop region includes the first drop region 111, the second drop region 113, and the third drop region 119. In a case that the user drags the target virtual items 113 to the third drop region 119, the terminal controls the virtual object 115 according to the second drag operation to drop all the target virtual items 113.

Figure 3:
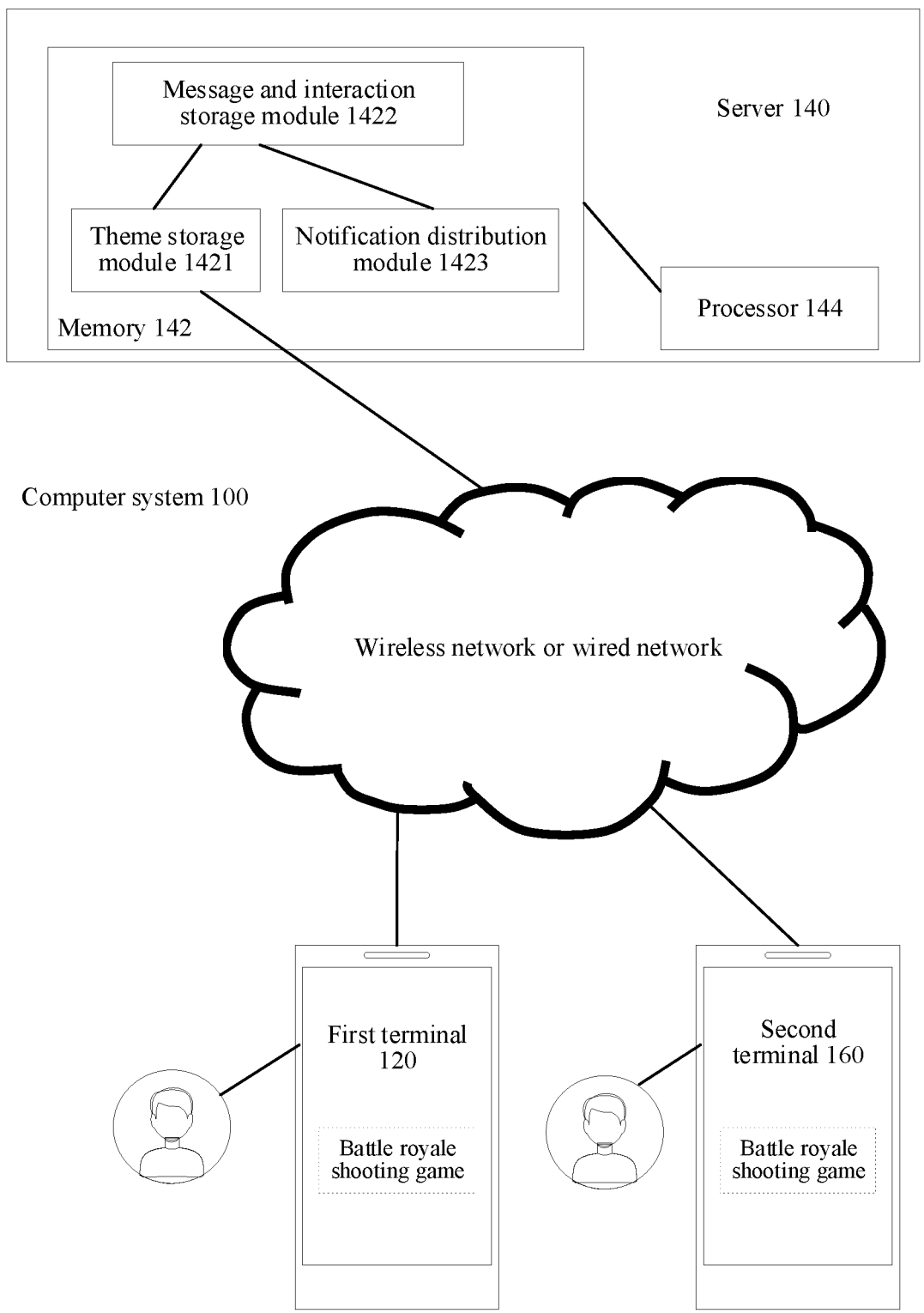
FIG. 3 is a block diagram of an implementation environment according to an exemplary embodiment of this application.

FIG. 3 is a structural block diagram of a computer system according to an exemplary embodiment of this application. The computer system 100 includes a first terminal 120, a server 140, and a second terminal 160.

An application program supporting a virtual environment is installed and run on the first terminal 120. The application program may be any one of a virtual reality application program, a three-dimensional map program, a military simulation program, an FPS game, a MOBA game, a multiplayer shooting survival game, and a battle royale shooting game. The first terminal 120 is a terminal used by a first user, the first user uses the first terminal 120 to control a first virtual object in the virtual environment to perform a movement, and the movement includes, but is not limited to, at least one of body posture adjustment, crawling, walking, running, cycling, jumping, driving, picking-up, shooting, attacking, and throwing. For example, the first virtual object is a first virtual person such as a simulated person role or a cartoon person role.

The first terminal 120 is connected to the server 140 by using a wireless network or a wired network.

The server 140 includes at least one of one server, a plurality of servers, a cloud computing platform, and a virtualization center. Schematically, the server 140 includes a processor 144 and a memory 142. The memory 142 includes a theme storage module 1421, a message and interaction storage module 1422, and a notification distribution module 1423. The server 140 is configured to provide a backend service for an application supporting a three-dimensional virtual environment. In some embodiments, the server 140 takes on primary computing work, and the first terminal 120 and the second terminal 160 take on secondary computing work; alternatively, the server 140 takes on secondary computing work, and the first terminal 120 and the second terminal 160 take on primary computing work; alternatively, collaborative computing is performed by using a distributed computing architecture among the server 140, the first terminal 120, and the second terminal 160.

An application supporting a virtual environment is installed and run on the second terminal 160. The application program may be any one of a virtual reality application program, a three-dimensional map program, a military simulation program, an FPS game, a MOBA game, a multiplayer shooting survival game, and a battle royale shooting game. The second terminal 160 is a terminal used by a second user, the second user uses the second terminal 160 to control a second virtual object in the virtual environment to perform a movement, and the movement includes, but is not limited to, at least one of body posture adjustment, crawling, walking, running, cycling, jumping, driving, picking-up, shooting, attacking, and throwing. For example, the second virtual object is a second virtual person, such as a simulated person role or a cartoon person role.

In some embodiments, the first virtual person and the second virtual person are located in the same virtual environment. In some embodiments, the first virtual person and the second virtual person may belong to the same team or the same organization, have a friend relationship, or have a temporary communication permission.

In some embodiments, the application programs installed on the first terminal 120 and the second terminal 160 are the same, or the application programs installed on the two terminals are the same type of application programs in different control system platforms. The first terminal 120 may generally refer to one of a plurality of terminals, and the second terminal 160 may generally refer to one of a plurality of terminals. In this embodiment, only the first terminal 120 and the second terminal 160 are used as an example for description. The first terminal 120 and the second terminal 160 are of the same or different device types. The device type includes at least one of a smartphone, a tablet computer, an e-book reader, an MP3 player, an MP4 player, a laptop, and a desktop computer. The following embodiment is described by using an example that the terminal includes a smartphone.

A person skilled in the art may learn that there may be more or fewer terminals. For example, there may be only one terminal, or there may be dozens of or hundreds of terminals or more. The quantity and the device type of the terminals are not limited in the embodiments of this application.

Figure 4:
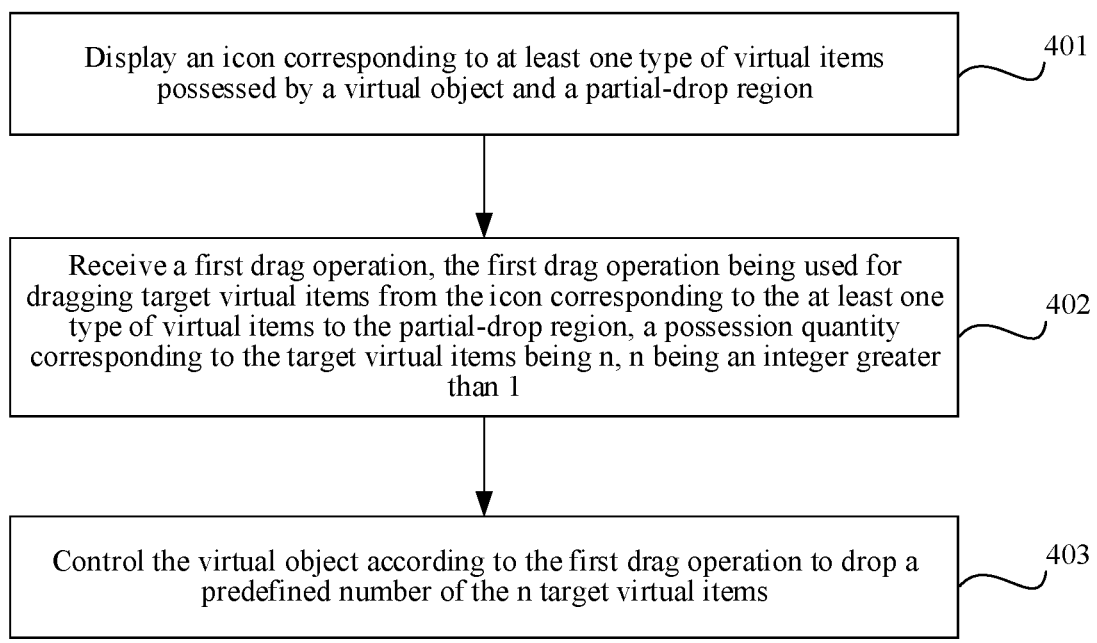
FIG. 4 is a flowchart of a method for dropping some of virtual items according to an exemplary embodiment of this application.

FIG. 4 is a flowchart of a method for controlling a virtual object to drop a virtual item according to an exemplary embodiment of this application. The method may be applied to a first terminal 120 or a second terminal 160 in the computer system shown in FIG. 3 or another terminal in the computer system. The terminal runs a client supporting a virtual environment. The method includes the following steps:

Step 401: A terminal displays an icon corresponding to at least one type of virtual items possessed by a virtual object and a partial-drop region.

An interface of an application on the terminal displays the at least one type of virtual items possessed by the virtual object 115 and the partial-drop region. In some embodiments, as shown in FIG. 2, a first drop region 111, a second drop region 112, target virtual items 113, a virtual item list 114, a virtual object 115, a virtual environment 116, another virtual object 117 (for example, the another virtual object may be a teammate in a group formed in a manner in which the user teams up with a virtual object controlled by a terminal of another user) in the virtual environment 116, and an equipment list 118 are further displayed on the interface of the application. The partial-drop region in the foregoing step is a drop region for dropping some target virtual items of all the target virtual items, and a quantity of the some target virtual items is less than a quantity of all the target virtual items. The first drop region is a drop region in which a quantity of to-be-dropped target virtual items is a fixed number, and the fixed number is a drop quantity in the application and is a preset fixed parameter or default value. The second drop region is a drop region in which a quantity of to-be-dropped target virtual items is a user-customized number of a quantity of to-be-dropped target virtual items.

In some embodiments, the virtual item is at least one of a virtual item of a medicine type, a virtual item of an energy type, a virtual item of a food type, and a virtual item of a weapon type. A virtual item of a medicine type is used for quickly replenishing and extending the life of the virtual object 115 in the virtual environment 116. A virtual item of an energy type is used for increasing the strength or stamina of the virtual object 115. Compared with the virtual item of a medicine type, the health points or the health bar of the virtual object 115 (a method for representing the life of the virtual object 115 in the virtual environment 116) is restored slower and cannot be restored to an initial state (that is, the health points or the health bar before the virtual object is harmed in any way). A virtual item of a food type is also used for increasing the strength or stamina of the virtual object 115. Compared with the virtual item of an energy type, the health points or the health bar of the virtual object 115 is slower to restore to the initial state. Virtual items of a weapon type are used for the virtual object 115 to fight in the virtual environment 116, for example, to complete close combat, shooting, throwing, and other actions. In some embodiments, the virtual item of a weapon type may include a gun, a landmine, a grenade, a bow and arrows, a pan for close combat, a dagger, or a sword, or may be an accessory such as a magazine, a gunstock, a muzzle, a grip, or a scope.

Step 402: The terminal receives a first drag operation, the first drag operation being used for dragging target virtual items from the icon corresponding to the at least one type of virtual items to the partial-drop region, a possession quantity corresponding to the target virtual items being n, n being an integer greater than 1

The first drag operation performed by the user on the target virtual items 113 is received on the terminal, and the first drag operation is used for dragging the target virtual items 113 of the at least one type of virtual items from a virtual item list 114 to the partial-drop region. In some embodiments, the target virtual item 113 may be at least one type of virtual items listed above. Schematically, descriptions are made by using an example in which a magazine is the target virtual item 113. The magazine is an instrument loaded with bullets and is an accessory used on a weapon of a gun type. A gun equipped with a magazine can be used for shooting operations. If the gun has no bullets, the gun is equipped with a magazine to ensure the normal use of the gun.

In some embodiments, the partial-drop region is located on any one of the upper side, lower side, left side, or right side of the interface of the application. The position of the partial-drop region in the interface of the application on the terminal is not limited in this application. Schematically, this application is described by using an example in which the partial-drop region is located on the right side of the interface of the application.

The partial-drop region includes a first drop region 111 and a second drop region 112. In some embodiments, the first drop region 111 may be located on any one of the upper side, lower side, left side, or right side of the second drop region. Relative positions of the first drop region 111 and the second drop region 112 are not limited in this application. Schematically, this application is described by using an example in which the first drop region 111 is located on the upper side of the second drop region 112.

In some embodiments, the first drag operation may be used for dragging the target virtual items 113 to the first drop region 111, or may be used for dragging the target virtual items 113 to the second drop region 112.

In some embodiments, n is an integer greater than 1. In some embodiments, the target virtual items 113 are at least one type of virtual items provided in the foregoing embodiments. Schematically, descriptions are made by using an example in which n is 20 and the target virtual items 113 are magazines. Reference may be made to FIG. 2.

Schematically, the user performs the first drag operation on the target virtual items 113. The target virtual items 113 are magazines, and a quantity of the target virtual items 113 possessed by the virtual object is 20. The target virtual items 113 are dragged to the first drop region 111.

Figure 5:
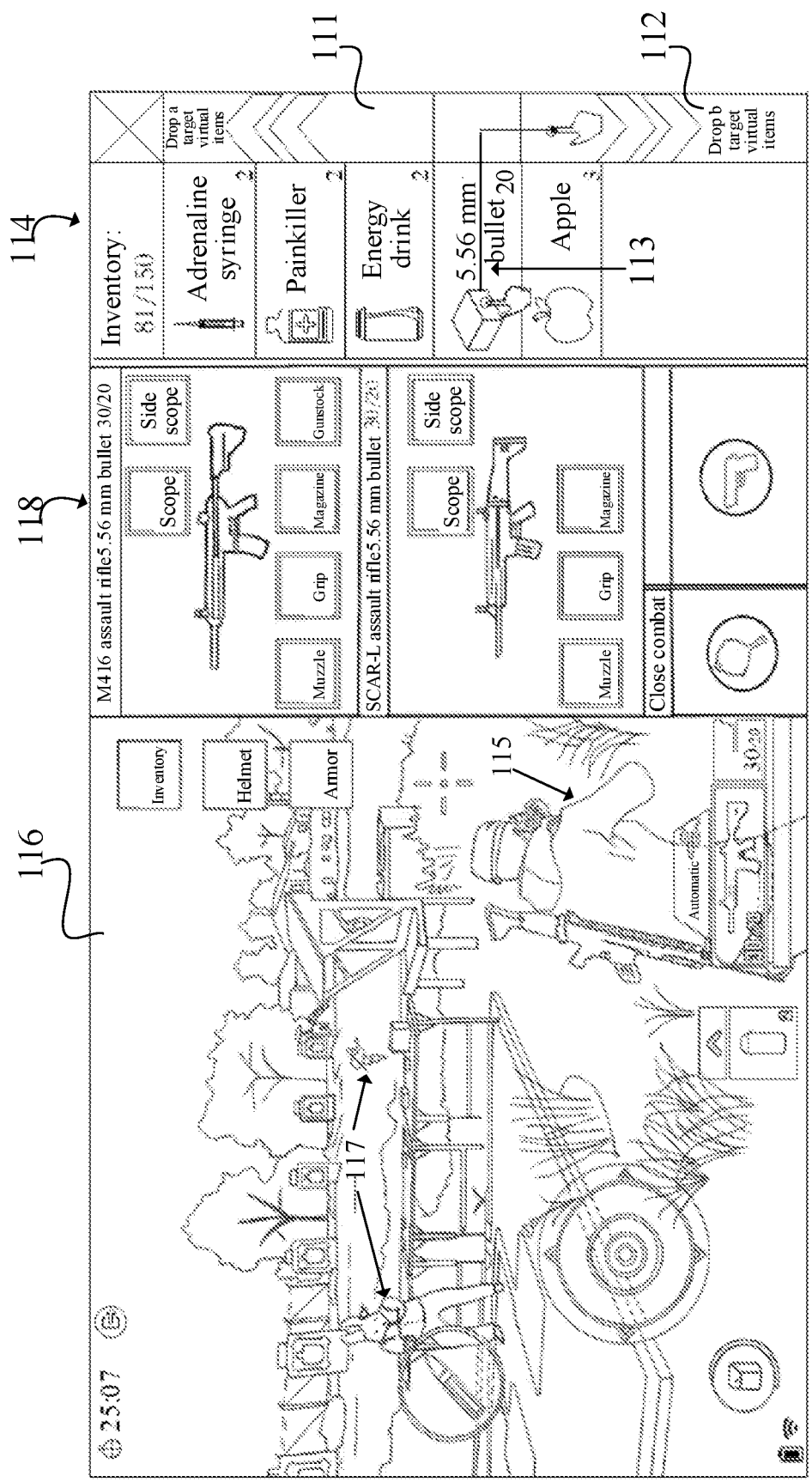
FIG. 5 is a schematic interface diagram of dropping some of virtual items according to another exemplary embodiment of this application.

Schematically, the target virtual items 113 may be alternatively dragged to the second drop region 112. Reference may be made to FIG. 5. Schematically, the user performs the first drag operation on the target virtual items 113. The target virtual items 113 are magazines, and a quantity of the target virtual items 113 possessed by the virtual object is 20. The target virtual items 113 are dragged to the second drop region 112.

Step 403: The terminal controls the virtual object according to the first drag operation to drop a predefined number of the n target virtual items.

The terminal controls the virtual object 115 according to the first drag operation to drop a predefined number of the n target virtual items 113 in the virtual item list 114. In some embodiments, n is an integer greater than 1. In some embodiments, the target virtual items 113 are at least one type of virtual items provided in the foregoing embodiments.

Schematically, descriptions are made by using an example in which n is 20, the target virtual items 113 are magazines, and the target virtual items are dragged to the first drop region 111 through the first drag operation. Reference may be made to FIG. 2. In a case that the target virtual items 113 are dragged to the first drop region 111 through the first drag operation, the terminal controls the virtual object 115 to drop a target virtual items 113. In some embodiments, the fixed number is any integer. Schematically, descriptions are made by using an example in which the fixed number is 1.

The user drags the target virtual items 113 to the second drop region 112. After receiving the first drag operation, the terminal controls the virtual object according to the first drag operation to drop one of the 20 target virtual items 113 (for example, the target virtual items are magazines), that is, to drop one target virtual item 113 from the virtual item list 114 of the virtual object 115 to the ground near the virtual object 115. In this case, the target virtual item 113 on the ground near the virtual object 115 may be picked up by another virtual object 117 in the virtual environment 116.

Schematically, descriptions are made by using an example in which n is 20, the target virtual items 113 are magazines, and the target virtual items 113 are dragged to the second drop region 112 through the first drag operation. Reference may be made to FIG. 5. In a case that the target virtual items 113 are dragged to the second drop region 112 through the first drag operation, the terminal controls the virtual object 115 to drop b target virtual items 113. In some embodiments, the user-customized number b is any integer. Schematically, descriptions are made by using an example in which b is 3.

The user drags the target virtual items 113 to the second drop region 112. After receiving the first drag operation, the terminal controls the virtual object according to the first drag operation to drop three of the 20 target virtual items 113 (for example, the target virtual items are magazines), that is, to drop three target virtual items 113 from the virtual item list 114 of the virtual object 115 to the ground near the virtual object 115. In this case, the target virtual items 113 on the ground near the virtual object 115 may be picked up by another virtual object 117 in the virtual environment 116.

In an example of this embodiment of this application, a provided in the foregoing embodiment is a parameter that has been set in the application. That is, a is a parameter representing a fixed quantity. According to different user experience or user needs, the value of a is set differently in different applications. The value of a in the same application also varies according to different operations completed by virtual objects selected by users or different virtual objects used by users in the same application.

b provided in the foregoing embodiment is a parameter customized by the user in the application. The user may set the value of b according to an operation habit in the application or an actual case in the virtual environment.

Based on the above, in this embodiment of this application, by dividing the partial-drop region into the first drop region for dropping a target virtual items and the second drop region for dropping b target virtual items. a is a fixed parameter or default value preset in the application, and b is a parameter that may be customized by a user. A particular quantity of the target virtual items are divided quickly from the target virtual items according to an operation habit of the user in the application or an actual case in a virtual environment and dropped, thereby simplifying the steps of dropping some of the target virtual items in the related art, and improving the operation efficiency.

Figure 6:
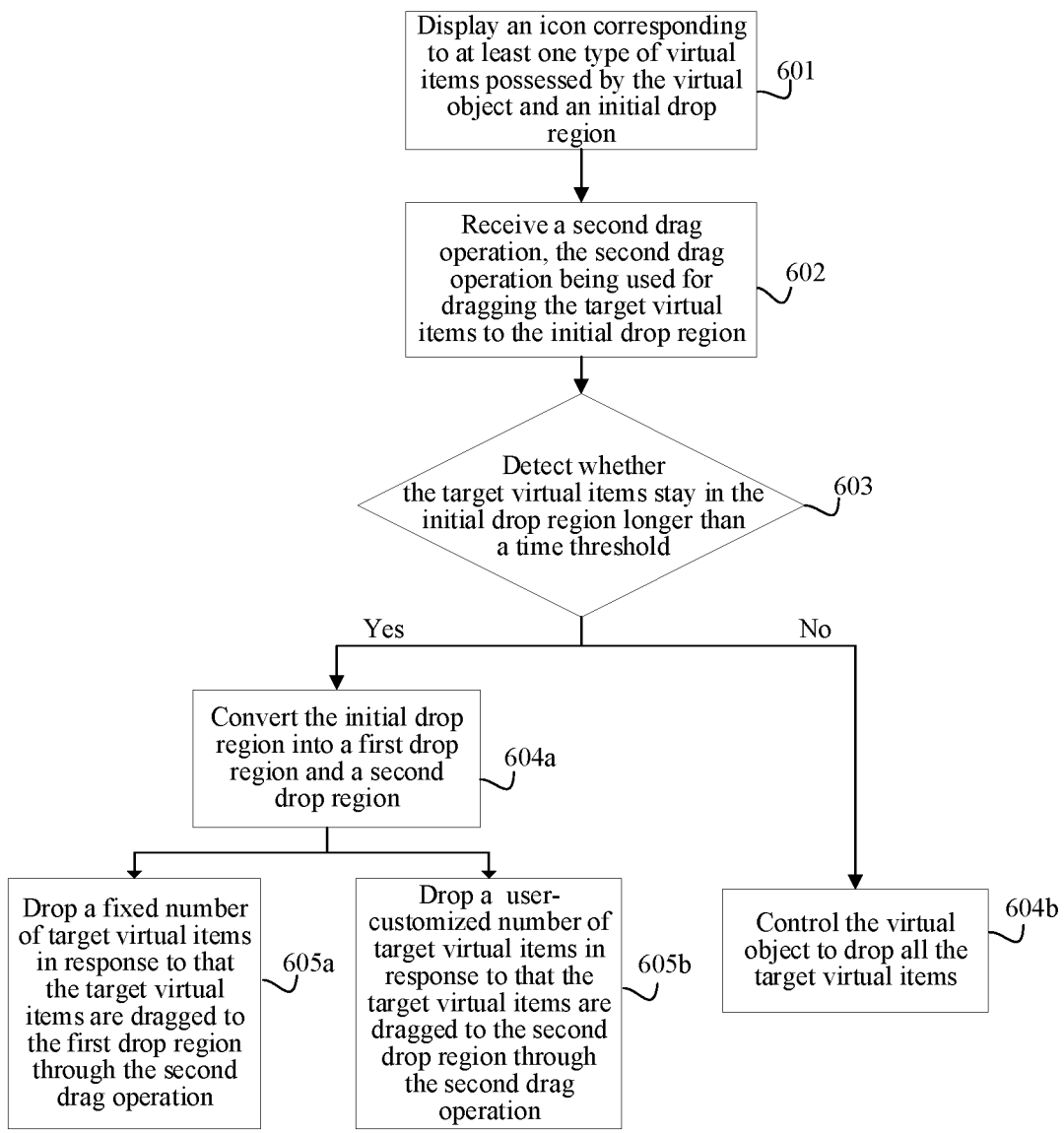
FIG. 6 is a flowchart of a method for dropping some of virtual items with reference to a time threshold according to an exemplary embodiment of this application.

FIG. 6 is a flowchart of a method for controlling, by using a terminal, a virtual object to drop a virtual item according to another exemplary embodiment of this application. The method may be applied to a first terminal 120 or a second terminal 160 in the computer system shown in FIG. 3 or another terminal in the computer system. The terminal runs a client supporting a virtual environment. The method includes the following steps:

Step 601: The terminal displays an icon corresponding to at least one type of virtual items possessed by the virtual object and an initial drop region.

An interface of an application on the terminal displays the at least one type of virtual items possessed by the virtual object 115 and the initial drop region. In some embodiments, the virtual item is at least one type of virtual items provided in the foregoing embodiments. An embodiment of this application is described by using an example in which the target virtual items 113 are magazines.

In some embodiments, the initial drop region is a drop region that has not been divided in the application, or a drop region of which division has been completed in the application, or a drop region divided in the application, but any of the drop regions after division is only displayed under a particular condition.

Schematically, in the interface of the application, there is only one drop region, and the drop region is the initial drop region. In the interface of the application, there are at least two drop regions. For example, there are a first drop region 111 and a second drop region 112, and regions in which the two drop regions are located are the initial drop regions. In the interface of the application, there is one drop region. However, under a particular condition (for example, meeting a set condition such as a time threshold or a quantity threshold), the drop region is activated, a drop region of which division has been completed is displayed, and a region before the drop region is activated is the initial drop region.

Schematically, this application is described by using an example in which the initial drop region is a drop region that has been divided in the application, but a drop region after the division is only displayed under a particular condition.

Step 602: The terminal receives a second drag operation, the second drag operation being used for dragging the target virtual items to the initial drop region.

The second drag operation performed by the user on the target virtual items 113 is received on the terminal, and the second drag operation is used for dragging the target virtual items to the initial drop region. In some embodiments, the initial drop region may be located on any one of the upper side, lower side, left side, or right side of the interface of the application. The position of the initial drop region in the interface of the application on the terminal is not limited in this application. Schematically, this application is described by using an example in which the initial drop region is located on the right side of the interface of the application.

Step 603. The terminal detects whether duration for which the target virtual items stay in the initial drop region is greater than a time threshold.

When the target virtual items 113 are dragged to the initial drop region through the second drag operation, duration for which the target virtual items 113 stay in the initial drop region is detected and compared with a time threshold set in the application. In the step, "stay" refers to that the target virtual items are located in the initial drop region temporarily. The user performs the second drag operation on the target virtual items 113. When the target virtual items stay in the initial drop region, in this case, a finger (or another body part that can perform a drag operation, or an auxiliary touch apparatus such as a capacitive stylus used by the user) of the user does not leave a display screen of the terminal on which the application is located. In some embodiments, the time threshold may be any integer. Schematically, the time threshold is set to 200 ms. Schematically, when the user drags the target virtual items, the target virtual items move with the user's finger, and the target virtual items stay in the initial drop region, that is, the user's finger stays in the initial drop region.

If the duration for which the target virtual items stay in the initial drop region is greater than the time threshold, step 604*a* is performed.

Step 604*a*: The terminal converts the initial drop region into a first drop region and a second drop region.

In the interface of the application on the terminal, in response to that the duration for which the target virtual items 113 stay in the initial drop region is greater than the time threshold, the initial drop region is activated. The initial drop region is converted from a single drop region into two drop regions, namely, the first drop region 111 and the second drop region 112. Step 605*a* and step 605*b* are performed, and the two steps are respectively described below.

Step 605*a*: The terminal drops a fixed number of target virtual items in response to that the target virtual items 113 are dragged to the first drop region through the second drag operation.

Schematically, the terminal first removes the a target virtual items from a virtual item list of the virtual object, and then displays the a target virtual items on the ground near the virtual object, to implement the step of dropping the a target virtual items into the virtual environment. For example, there are originally x target virtual items in the virtual item list of the virtual object, and a manner in which the terminal drops the a target virtual items is as follows: removing the a target virtual items from the virtual item list. In this case, there are (x-a) target virtual items in the virtual item list after the removal, and the a target virtual items are then displayed on the ground near the virtual object. x is an integer greater than a.

With reference to FIG. 2, the target virtual items 113 are dragged to the first drop region 111 through the second drag operation, and the virtual object is controlled according to the second drag operation to drop the fixed number (e.g., a) of target virtual items 113. In some embodiments, a is any integer and is a fixed parameter or default value preset in the application. Schematically, descriptions are made by using an example in which a preset value of a is 1 in the application. In response to that the target virtual items 113 are dragged to the first drop region 111 through the second drag operation, the terminal controls the virtual object 115 to drop one target virtual item 113, that is, to drop one target virtual item 113 from the virtual item list 114 of the virtual object 115 to the ground near the virtual object 115. In this case, the target virtual item 113 on the ground near the virtual object 115 may be picked up by another virtual object 117 in the virtual environment 116. Schematically, if a dropped virtual item is not picked up in a period of time, the virtual item may be controlled to disappear in the virtual environment.

Step 605b: The terminal drops a user-customized number of target virtual items in response to that the target virtual items are dragged to the second drop region through the second drag operation.

Schematically, the terminal first removes the user-customized number of target virtual items from the virtual item list of the virtual object, and then displays the user-customized number of target virtual items on the ground near the virtual object, to implement the step of dropping the user-customized number of target virtual items into the virtual environment. For example, there are originally x target virtual items in the virtual item list of the virtual object, and a manner in which the terminal drops the user-customized number of target virtual items is as follows: removing the user-customized number of target virtual items from the virtual item list. In this case, there are (x-b) target virtual items in the virtual item list after the removal, and the user-customized number of target virtual items are then displayed on the ground near the virtual object. x is an integer greater than b.

With reference to FIG. 5, the target virtual items 113 are dragged to the second drop region 112 through the second drag operation, and the virtual object is controlled according to the second drag operation to drop the user-customized number (e.g., b) of target virtual items 113. In some embodiments, the user-customized number is any integer and is a parameter that can be customized by the user in the application. Schematically, descriptions are made by using an example in which b is 3. In response to that the target virtual items 113 are dragged to the second drop region 112 through the second drag operation, the terminal controls the virtual object 115 to drop three target virtual items 113, that is, to drop three target virtual items 113 from the virtual item list 114 of the virtual object 115 to the ground near the virtual object 115. In this case, the target virtual items 113 on the ground near the virtual object 115 may be picked up by another virtual object 117 in the virtual environment 116.

In some embodiments, the foregoing drop region further includes the third drop region 119. The drop region is used for dropping all the target virtual items 113. Schematically, the user performs the second drag operation on the target virtual items 113 and drags the target virtual items 113 to the drop region. After receiving the second drag operation, the terminal activates the drop region. In this case, the drop region includes the first drop region 111, the second drop region 113, and the third drop region 119. In response to that the user drags the target virtual items 113 to the third drop region 119, the terminal controls the virtual object 115 according to the second drag operation to drop all the target virtual items 113.

If the duration for which the target virtual items stay in the initial drop region is less than the time threshold, step 604b is performed.

Step 604b: The terminal controls the virtual object to drop all the target virtual items.

In response to that the duration for which the target virtual items 113 stay in the initial drop region is less than the time threshold, the terminal controls the virtual object 115 to drop all the target virtual items 113.

Schematically, the terminal first removes the target virtual items from the virtual item list of the virtual object, and then displays all the target virtual items on the ground near the virtual object, to implement the step of dropping all the target virtual items into the virtual environment. For example, there are originally x target virtual items in the virtual item list of the virtual object, and a manner in which the terminal drops all the target virtual items is as follows: removing all the target virtual items from the virtual item list. In this case, there are no target virtual item in the virtual item list after the removal, and the x target virtual items are then displayed on the ground near the virtual object. x is a positive integer.

Figure 7:
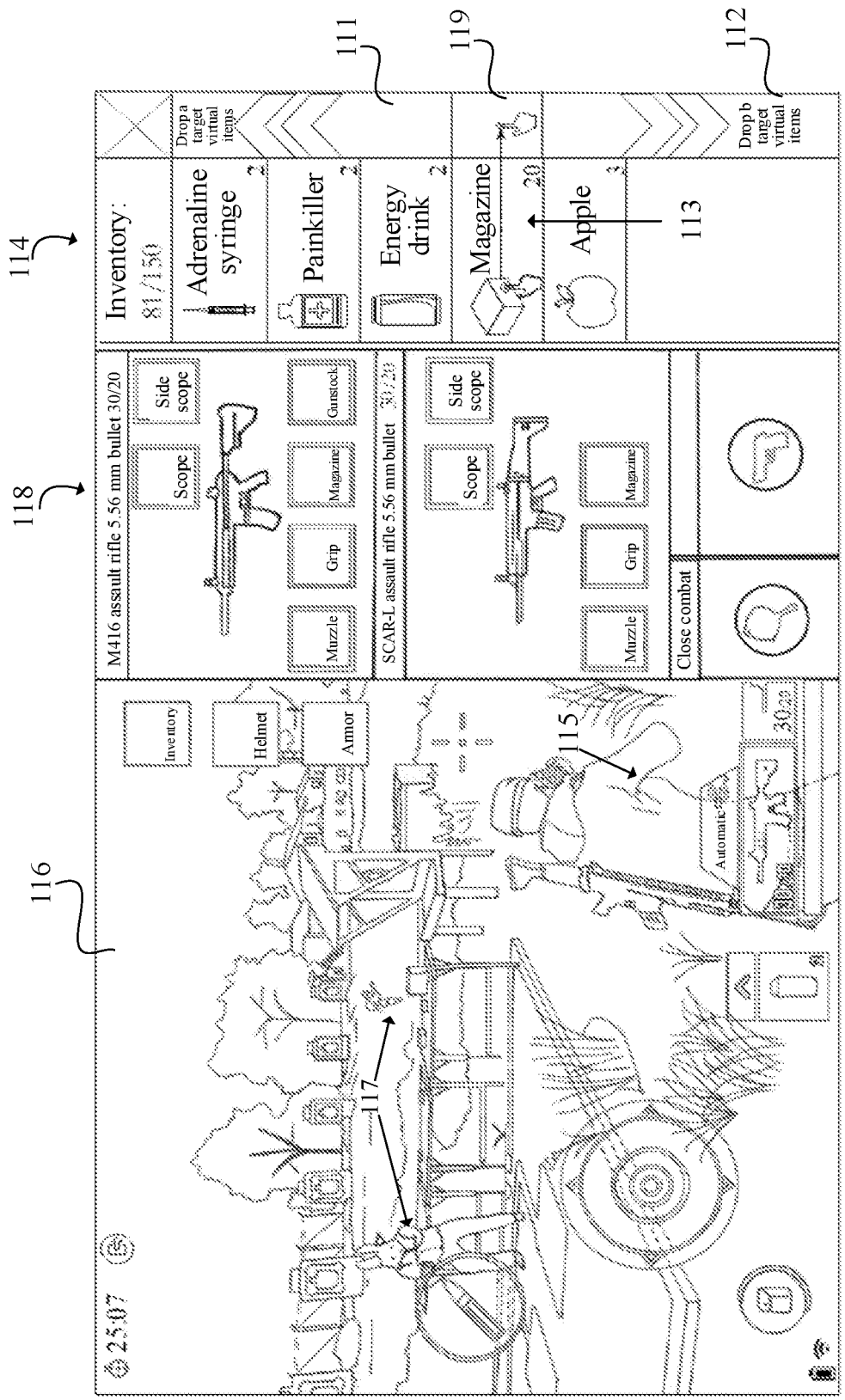
FIG. 7 is a schematic interface diagram of dropping all virtual items according to an exemplary embodiment of this application.

With reference to FIG. 7, descriptions are made by using an example in which magazines are used as the target virtual items 113. In response to that the target virtual items 113 are dragged to the initial drop region through the second drag operation, and duration for which the target virtual items 113 stay in the initial drop region is less than the time threshold, the terminal controls the virtual object 115 to drop all the target virtual items 113, that is, to drop all the target virtual items 113 (magazines, of which a quantity is 20) from the virtual item list 114 of the virtual object 115 to the ground near the virtual object 115. In this case, the target virtual items 113 on the ground near the virtual object 115 may be picked up by another virtual object 117 in the virtual environment 116.

Based on the above, in this embodiment of this application, it is detected whether the duration for which the target virtual items stay in the initial drop region is greater than the time threshold set in the application. If the duration for which the target virtual items stay in the initial drop region is greater than the time threshold, the initial drop region is activated and converted into the first drop region for dropping a target virtual items and the second drop region for dropping b target virtual items. If the duration for which the target virtual items stay in the initial drop region is less than the time threshold, all the target virtual items are dropped. The time threshold is set in the application, so that the operation steps of dropping some of the target virtual items are simplified while ensuring that all the target virtual items can be dropped, thereby quickly dropping some of the target virtual items.

Figure 8:
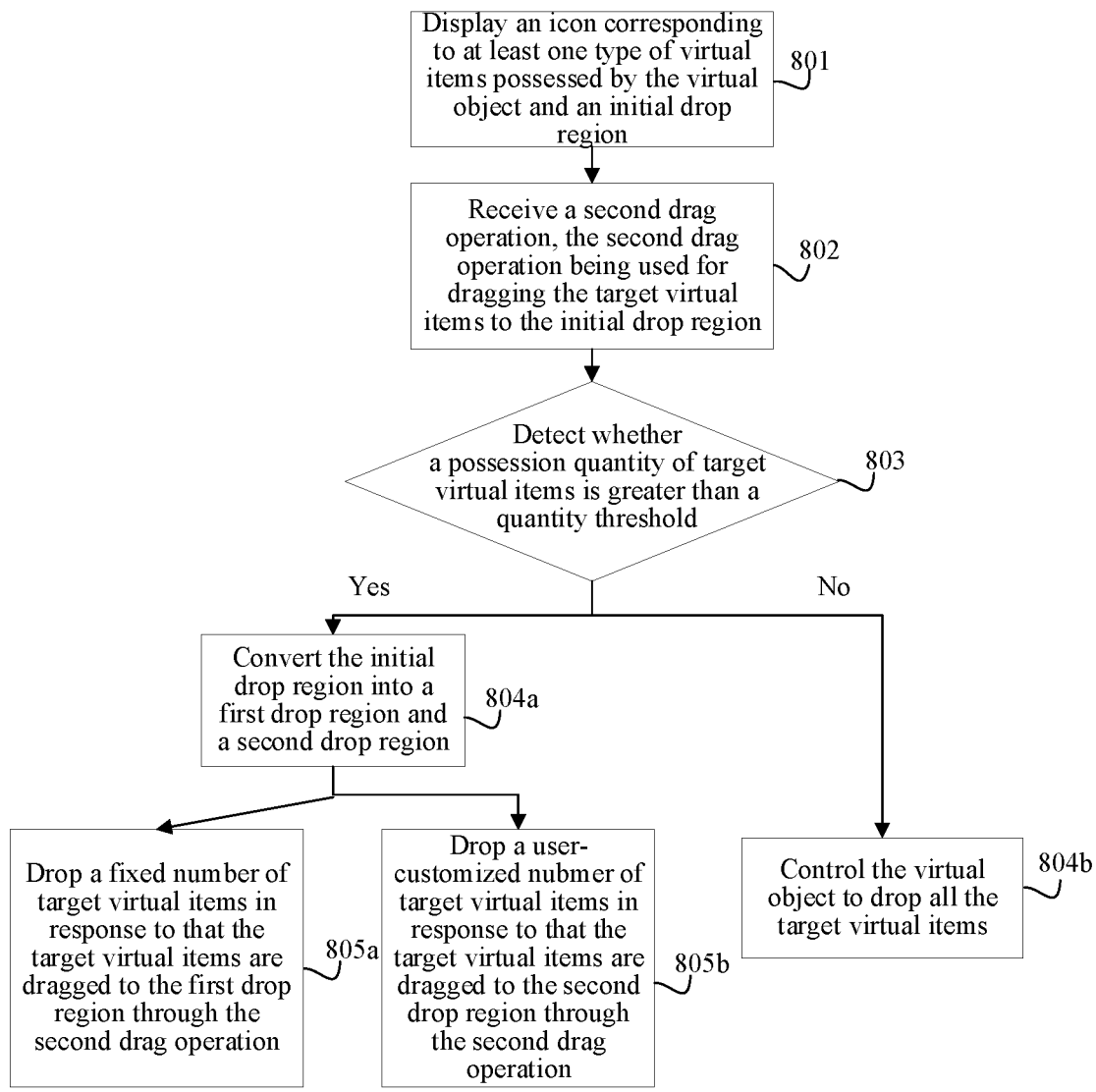
FIG. 8 is a flowchart of a method for dropping some of virtual items with reference to a quantity threshold according to an exemplary embodiment of this application.

FIG. 8 is a flowchart of a method for controlling a virtual object to drop a virtual item according to another exemplary embodiment of this application. The method may be applied to a first terminal 120 or a second terminal 160 in the computer system shown in FIG. 3 or another terminal in the computer system. The terminal runs a client supporting a virtual environment. The method includes the following steps:

Step 801: The terminal displays an icon corresponding to at least one type of virtual items possessed by the virtual object and an initial drop region.

Step 802: The terminal receives a second drag operation, the second drag operation being used for dragging the target virtual items to the initial drop region.

Step 803. The terminal detects whether a possession quantity of target virtual items is greater than a quantity threshold.

In response to that the target virtual items 113 are dragged to the initial drop region through the second drag operation, the terminal detects the target virtual items 113 (which include carried or equipped target virtual items 113) possessed by the virtual object 115 and compares the quantity of the possessed target virtual items with the quantity threshold set in the application. In some embodiments, the quantity threshold may be any integer. Schematically, the quantity threshold is set to 2.

In some embodiments, as shown in FIG. 7, in a case that the target virtual items 113 are dragged to a third drop region 119 through the second drag operation, the terminal controls the virtual object 115 according to the second drag operation to drop all the target virtual items 113.

If the possession quantity of the target virtual items 113 is greater than the quantity threshold, step 804a is performed.

Step 804a: The terminal converts the initial drop region into a first drop region and a second drop region.

In response to that the possession quantity of the target virtual items 113 is greater than the quantity threshold, the initial drop region is activated. The initial drop region is converted from a single drop region into two drop regions, namely, the first drop region 111 and the second drop region 112. Step 805a and step 805b are performed, and the two steps are respectively described below.

Step 805a: The terminal drops a fixed number of target virtual items in response to that the target virtual items are dragged to the first drop region through the second drag operation.

Step 805b: The terminal drops a user-customized number of target virtual items in response to that the target virtual items are dragged to the second drop region through the second drag operation.

In some embodiments, as shown in FIG. 7, in a case that the target virtual items 113 are dragged to a third drop region 119 through the second drag operation, the terminal controls the virtual object 115 according to the second drag operation to drop all the target virtual items 113. The operation is to drop all the target virtual items 113 from the virtual item list 114 of the virtual object 115 to the ground near the virtual object 115. In this case, all the target virtual items 113 on the ground near the virtual object 115 may be picked up by another virtual object 117 in a virtual environment 116.

If the possession quantity of the target virtual items is less than the quantity threshold, step 804b is performed.

Step 804b: The terminal controls the virtual object to drop all the target virtual items.

In response to that the possession quantity of the target virtual items 113 is less than the quantity threshold, the terminal controls the virtual object 115 to drop all the target virtual items 113.

In some embodiments, in a case that the quantity threshold is used as a determining condition, the foregoing initial drop region is any one of an interface of a divided drop region displayed after the initial drop region is activated and an interface of a drop region of which the division has been completed and displayed in the application (for example, the initial drop region includes: the first drop region 111, the second drop region 112, and the third drop region 119), and a user may select, according to the foregoing divided drop regions, the target virtual items 113 to drop.

In response to that the possession quantity of the target virtual items 113 is less than a quantity of the target virtual items that are allowed to be dropped in a drop region, optionally, the target virtual items 113 are all dropped, or the target virtual items 113 cannot be dropped and are still displayed in a virtual item list 114, and the possession quantity of the target virtual items 113 remains the same. In some embodiments, in response to that the target virtual items 113 cannot be dropped, prompt information indicating that the target virtual items cannot be dropped may further be added and displayed.

Based on the above, in this embodiment of this application, it is detected whether the possession quantity of the target virtual items is greater than the quantity threshold set in the application. If the possession quantity of the target virtual items is greater than the quantity threshold, the initial drop region is activated and converted into the first drop region for dropping a target virtual items and the second drop region for dropping b target virtual items. If the possession quantity of the target virtual items is less than the quantity threshold, all the target virtual items are dropped. The quantity threshold is set in the application, so that a misoperation, for example, dropping all the target virtual items, is avoided for a user in an emergency. In addition, the operation steps of dropping some of the target virtual items are simplified while ensuring that all the target virtual items can be dropped, thereby quickly dropping some of the target virtual items.

Figure 9:
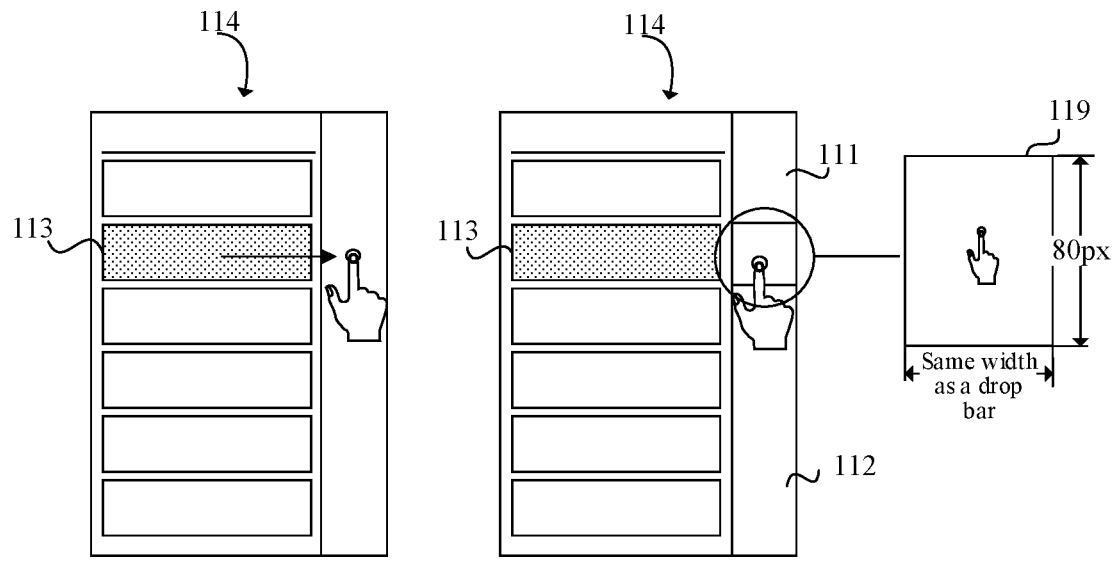
FIG. 9 is a schematic interface diagram of subregions of a drop region according to an exemplary embodiment of this application.

FIG. 9 is a schematic interface diagram of a drop region according to an embodiment of this application. Schematically, descriptions are made by using an example in which an initial drop region is an interface of a divided drop region displayed after the initial drop region is activated. The interface includes: a first drop region 111, a second drop region 112, target virtual items 113, a virtual item list 114, and a third drop region 119 (that is, a drop-all region). A user performs a second drag operation on the target virtual items 113 and drags the target virtual items 113 to the drop region. After receiving the second drag operation, a terminal activates the drop region. In this case, the drop region includes the first drop region 111, the second drop region 112, and the third drop region 119.

In some embodiments, the initial drop region may be located on any one of the upper side, lower side, left side, or right side of the interface of the application. Schematically, descriptions are made by using an example in which the initial drop region is located on the right side of the interface of the application. In some embodiments, the first drop region 111 after the activation may be located on any one of the upper side, lower side, left side, or right side of the second drop region 112. Schematically, descriptions are made by using an example in which the first drop region 111 is located on the upper side of the second drop region 112.

In some embodiments, the third drop region 119 may be a figure in any shape such as a circle, a rectangle, or a triangle, and the area of the third drop region 119 is not limited in this application. Schematically, this application is described by using an example in which the third drop region 119 is a rectangle, the length is 80 pixels, and the width is equal to the width of the drop region as an example. In some embodiments, the third drop region may be a drop region corresponding to a position of any target virtual item in a virtual item list 114, or may be a drop region corresponding to any plurality of target virtual items 113 in the virtual item list 114. The position of the third drop region is not limited in this application. Schematically, descriptions are made by using an example in which the third drop region is a drop region corresponding to a position of any target virtual item in the virtual item list 114.

Referring to FIG. 9, a drop region corresponding to a position of the target virtual items 113 (a region marked with black dots in FIG. 9) is the third drop region 119. It can be understood that, when the target virtual items 113 are the first one in the virtual item list in FIG. 9 (a virtual item list bar above the region marked with black dots in FIG. 9) or the third one (a virtual item list bar below the region marked with black dots in FIG. 9), or the last one (the sixth virtual item list bar in FIG. 9), after the initial drop region is activated, a display position of the third drop region 119 changes as the bar of the target virtual items 113 changes. For example, the length and height of the display position of the third drop region 119 are the same as those of the bar of the selected target virtual items 113.

The quantity of types of virtual items displayed or included in the virtual item list 114 is not limited in this application. The quantity of types of virtual items displayed or included in the virtual item list 114 varies according to different settings in different applications or according to a quantity of types of virtual items possessed by the virtual object 115 in the same application.

Based on the above, in this embodiment of this application, the third drop region changes as the position of the target virtual items changes, which simplifies the step that the user drags the target virtual items to the corresponding first drop region or second drop region, reduces the time for the user to drop some of the target virtual items, and increases the flexibility of the operation of dropping some of the target virtual items.

Descriptions are made below with reference to a method for customizing a drop quantity of the target virtual items.

Figure 10:
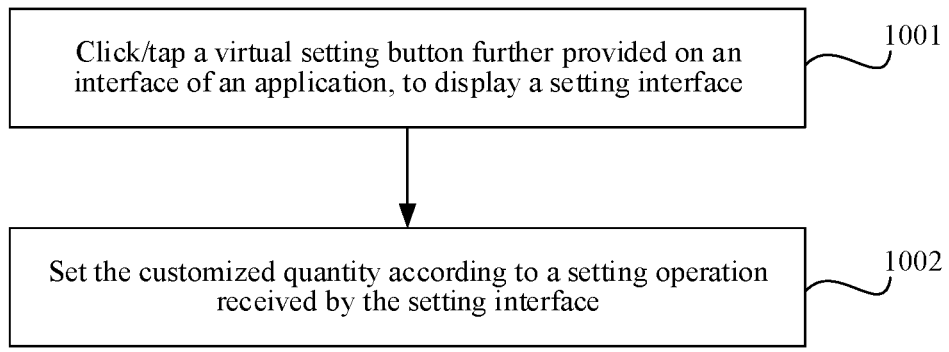
FIG. 10 is a flowchart of a method for customizing a drop quantity of virtual items according to an exemplary embodiment of this application.

FIG. 10 is a flowchart of a method for customizing a drop quantity of target virtual items according to an embodiment of this application. The method is used for setting a drop quantity of target virtual items. The method may be applied to a first terminal 120 or a second terminal 160 in the computer system shown in FIG. 3 or another terminal in the computer system. The terminal runs a client supporting a virtual environment. The method includes the following steps:

Step 1001. Click/tap a virtual setting button further provided on an interface of an application, to display a setting interface.

A virtual setting button is further provided on the interface of the application. In some embodiments, the virtual setting button is fixed on the interface of the application or is a movable virtual hover button. When the virtual setting button is fixed on the interface of the application, optionally, the virtual setting button is located at any one of the left edge, right edge, upper edge, and lower edge of the interface of the application, or located at any one of the upper left corner, upper right corner, lower left corner, and lower right corner of the interface of the application. When the virtual setting button is located on the edge of the interface of the application, optionally, the virtual setting button is located at any position on one side edge. This is not limited in this application. Schematically, the virtual setting button is located at the midpoint of the left side edge of the interface of the application. When the virtual setting button is a movable hover button, optionally, when a user does not operate the virtual setting button, the virtual setting button is hidden on the interface of the application. Alternatively, when the user drags the virtual setting button to a side edge of the interface of the application, the virtual button is hidden to the side edge after being released. Schematically, the user may drag the virtual setting button to any position on the interface of the application, and the virtual setting button is "Hide" on the interface of the application. "Hide" refers to that the color of the virtual setting button is transparent and does not affect the user's normal viewing of the content on the interface of the application.

The user clicks/taps the virtual setting button. The terminal receives a trigger signal and displays the setting interface. In some embodiments, When the user is not in a battle, or when the user completes the foregoing operations while in a battle, the setting interface is displayed.

The customization of the drop quantity of the target virtual items is described below with reference to a schematic diagram of the setting interface.

Figure 11:
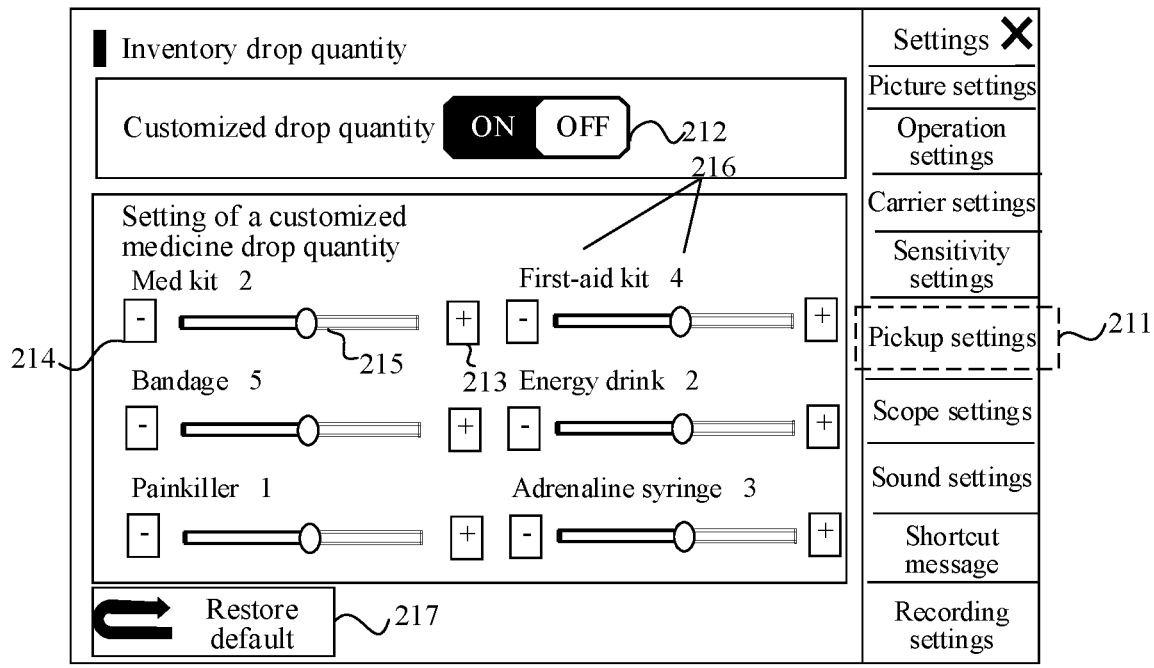
FIG. 11 is a schematic interface diagram of setting a drop quantity of virtual items according to an exemplary embodiment of this application.

Referring to FIG. 11, FIG. 11 is a schematic interface diagram of customizing a drop quantity of target virtual items according to an embodiment of this application. The interface includes: a pickup setting button 211, a switch button 212 for customizing a drop quantity, a quantity-increase button 213, a quantity-decrease button 214, a slider 215, target virtual item information 216 (which includes a name and a drop quantity of the target virtual items 113), and a default reset button 217.

In some embodiments, the drop quantity of the target virtual items 113 may be changed by using a quantity-increase button 213 or a quantity-decrease button 214 or may be changed by dragging the slider 215. Alternatively, the drop quantity of the target virtual items 113 may be changed by the user using a tool connected to the terminal, for example, a mouse, a handle, or a joystick. For example, the user may scroll a mouse wheel to change the drop quantity of the target virtual items.

In some embodiments, the information 216 of the target virtual items further includes an attribute of the target virtual items, a function of the target virtual items, or a usage condition of the target virtual items. Schematically, a first-aid kit is used for increasing the health points of the virtual object 115 by 10 and can be used when the health points of the virtual object is less than 50.

In some embodiments, when the slider 215 moves in a first direction, the drop quantity of the target virtual items 113 increases, and when the slider 215 moves in a second direction, the drop quantity of the target virtual items 113 decreases. In some embodiments, the first direction may be any one of a left direction, right direction, upper direction, or lower direction relative to the setting interface. The second direction may be any one of a left direction, right direction, upper direction, or lower direction relative to the setting interface. Schematically, descriptions are made by using an example in which the first direction is a right direction relative to the setting interface, and the second direction is a left direction relative to the setting interface.

In some embodiments, the default reset button 217 on the interface is used for setting, with one click/tap, the drop quantity of the target virtual items displayed on the setting interface to an initial drop value (an initial drop quantity) of each type of target virtual items 113 set in the application, or set the drop quantity back to a drop quantity of each type of target virtual items 113 set by the user last time. Schematically, if the initial drop quantity of each type of target virtual items 113 set in the application is 1, the user clicks/taps the default reset button 217, and the drop quantity of each type of target virtual items 113 is set to 1. Schematically, if a drop quantity of each type of target virtual items 113 set by the user last time is 2, the drop quantity of each type of target virtual items 113 is set to 2. It can be understood that if the drop quantities of the types of the target virtual items 113 set by the user last time are different, drop quantities of the types of the target virtual items 113 are set according to the drop quantities of the types of the target virtual items 113 set by the user last time.

Schematically, this application is described by using an example in which the quantity of the target virtual items 113 (for example, first-aid kits) is increased to 4 by dragging the slider 215.

Step 1002. Set the user-customized number according to a setting operation received by the setting interface.

According to a setting operation of dragging the slider 215 to the right direction received by the setting interface, the terminal ends the setting process in response to that the drop quantity of the target virtual items 113 reaches 4.

It can be understood that, when the quantity of the target virtual items 113 (for example, first-aid kits) is reduced from 4 to 2 by dragging the slider 215, the slider 215 is moved to the left. According to the setting operation of dragging the slider 215 to the left direction received by the setting interface, when the drop quantity of the target virtual items 113 reaches 2, the setting process ends.

The foregoing embodiment describes the foregoing method based on an application scenario of a game, and the foregoing method is exemplarily described based on an application scenario of military simulation below.

Simulation technology is a model technology that application software and hardware reflect a behavior or a process of a system through experiments that simulate a real environment.

A military simulation program is a program specially constructed for a military application by using the simulation technology, to perform a quantitative analysis on combat elements such as navy, army, and air force elements, weapon equipment performance, and combat operations, and further accurately simulate a battlefield environment, present a battlefield situation, and implement evaluation and decision-making assistance of a combat system.

In an example, soldiers set up a virtual battlefield on a terminal on which the military simulation program is located, and fight in teams. The soldiers control virtual objects in the virtual battlefield environment to perform at least one operation of walking, running, climbing, driving, shooting, throwing, reconnaissance, and close combat in the virtual battlefield environment. The virtual battlefield environment includes at least one form of flat lands, mountains, plateaus, basins, deserts, rivers, lakes, the ocean, vegetation, and buildings. The virtual object includes a virtual person, a virtual animal, a cartoon person, and the like. Each virtual object has a respective shape and size in the three-dimensional virtual environment, and occupies some space in the three-dimensional virtual environment.

Based on the above, optionally, when at least two teammates in the same team as a soldier need the help with virtual items (for example, the teammates have no bullets to be loaded into guns), schematically, virtual objects 117 controlled by the two teammates in the same team with the soldier need the help with virtual items. Reference may be made to FIG. 5. In some embodiments, the value of a is a fixed parameter or default value preset in the military simulation program, b is a parameter that can be customized by a solider, and the solider can set the value of b any time according to a requirement or an actual case. Schematically, the fixed parameter or default value of a preset in the military simulation program is 1. The soldier customizes the value of b and sets the value of b to 2. The virtual items (for example, magazines) required by the virtual objects 117 controlled by the teammates are the target virtual items 113. The soldier performs a first drag operation on the target virtual items 113, and drags the target virtual items 113 to a second drop region 112. The terminal receives the first drag operation, and controls the virtual object 115 according to the first drag operation to drop two target virtual items 113 into the virtual battlefield environment.

It can be understood that, when virtual objects 117 controlled by three teammates need the help with virtual items, optionally, the soldier may set the value of b to 3 according to the method for setting the value of b in the foregoing embodiment and repeat the foregoing steps. In this way, virtual items (that is, target virtual items) required by the virtual objects 117 controlled by the three teammates can be dropped into the virtual battlefield environment. The rest is deduced by analogy.

In some embodiments, in the military simulation program, some of the target virtual items 113 are dropped by the soldier to the virtual battlefield environment. The some of the target virtual items 113 dropped by the soldier can be picked up by a virtual object controlled by an opponent soldier whose equipped inventory still has capacity. Alternatively, when attributes of the dropped target virtual items 113 are better than attributes of virtual items of the same type that are possessed by the virtual object controlled by the opponent soldier, the virtual object controlled by the opponent soldier may drop the possessed virtual items and pick up the dropped target virtual items 113. An attribute of a virtual item includes at least one of attributes such as a level, damage, and effects of the virtual item acting on a virtual object.

Based on the military simulation program, when a virtual object dies in the virtual battlefield environment, virtual items possessed by the virtual object are automatically dropped into the virtual battlefield environment by a system for another virtual object to pick up.

Referring to FIG. 6, in an example, at least one type of virtual items possessed by the virtual object 115 and an initial drop region are displayed on an interface of the military simulation program on the terminal. In the example, magazines are used as the target virtual items 113 for descriptions. A time threshold is set in the military simulation program. In some embodiments, the time threshold may be any duration greater than zero. Schematically, the time threshold is 300 ms. The soldier performs a second drag operation on the target virtual items 113 and drags the target virtual items 113 to the initial drop region. The terminal receives the second drag operation, and detects whether duration for which the target virtual items stay in the initial drop region is greater than the time threshold. In a case that the duration for which the target virtual items stay in the initial drop region is greater than the time threshold, the initial drop region is activated and converted into a first drop region 111, a second drop region 112, and a third drop region 119. When the target virtual items 113 are dragged to the first drop region 111 through the second drag operation, one target virtual item 113 is dropped (in the military simulation program, schematically, the value of a is 1). When the target virtual items 113 are dragged to the second drop region 112 through the second drag operation, two target virtual items 113 are dropped (schematically, the soldier customizes the value of b and sets the value of b to 2). When the target virtual items 113 are dragged to the third drop region 119 through the second drag operation, all the target virtual items 113 are dropped. In a case that the duration for which the target virtual items stay in the initial drop region is less than the time threshold, the terminal controls the virtual object to drop all the target virtual items 113.

Referring to FIG. 8, in an example, at least one type of virtual items possessed by the virtual object 115 and an initial drop region are displayed on an interface of the military simulation program on the terminal. In the example, magazines are used as the target virtual items 113 for descriptions. A quantity threshold is set in the military simulation program. In some embodiments, the quantity threshold may be any integer greater than zero. Schematically, the quantity threshold is 2. The soldier performs a second drag operation on the target virtual items 113 and drags the target virtual items 113 to the initial drop region. The terminal receives the second drag operation, and detects whether a possession quantity of the target virtual items 113 is greater than the quantity threshold. In a case that the possession quantity of the target virtual items 113 is greater than the quantity threshold, the initial drop region is activated and converted into a first drop region 111 and a second drop region 112. When the target virtual items 113 are dragged to the first drop region 111 through the second drag operation, one target virtual item 113 is dropped (in the military simulation program, schematically, the value of a is 1). When the target virtual items 113 are dragged to the second drop region 112 through the second drag operation, two target virtual items 113 are dropped (schematically, the soldier customizes the value of b and sets the value of b to 2). When the target virtual items 113 are dragged to a third drop region 119 through the second drag operation, all the target virtual items 113 are dropped. In a case that the possession quantity of the target virtual items 113 is less than the quantity threshold, the terminal controls the virtual object to drop all the target virtual items 113.

Based on the above, in this embodiment of this application, the foregoing method for controlling a virtual object to drop some virtual items is applied to the military simulation program, which can improve combat efficiency and help to enhance the cooperation between users.

The following is an apparatus embodiment of this application. For details not described in detail in the apparatus embodiment, reference may be made to corresponding record in the foregoing method embodiments. Details are not repeated herein.

Figure 12:
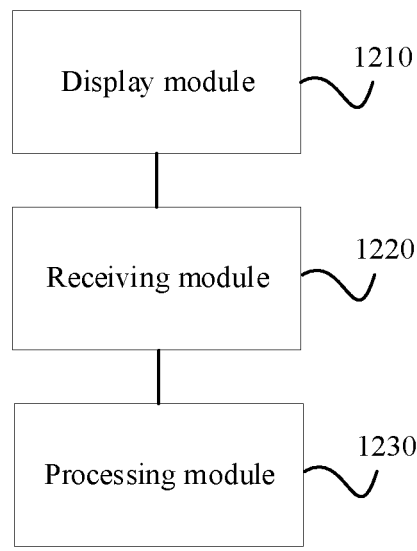
FIG. 12 is a schematic structural diagram of an apparatus for controlling a virtual object to drop a virtual item according to an exemplary embodiment of this application.

FIG. 12 is a schematic structural diagram of an apparatus for controlling a virtual object to drop a virtual item according to an exemplary embodiment of this application. The apparatus may be implemented as the terminal or a part of the terminal by means of software, hardware, or a combination thereof. The apparatus includes: a display module 1210, a receiving module 1220, and a processing module 1230. The display module 1210 and the receiving module 1220 are optional modules.

The display module 1210 is configured to display at least one type of virtual items possessed by a virtual object and a partial-drop region.

The receiving module 1220 is configured to receive a first drag operation, the first drag operation being used for dragging target virtual items from the icon corresponding to the at least one type of virtual items to the partial-drop region, a possession quantity corresponding to the target virtual items being n, n being an integer greater than 1.

The processing module 1230 is configured to control the virtual object according to the first drag operation to drop a predefined number of the n target virtual items.

In an optional embodiment, the processing module 1230 is further configured to: control, in response to that the target virtual items are dragged to the first drop region through the first drag operation, the virtual object to drop a fixed number of target virtual items; and control, in response to that the target virtual items are dragged to the second drop region through the first drag operation, the virtual object to drop a user-customized number of target virtual items.

In an optional embodiment, the processing module 1230 is further configured to remove the a target virtual items from a virtual item list of the virtual object.

The display module 1210 is further configured to display the a target virtual items on the ground near the virtual object.

The processing module 1230 is further configured to remove the user-customized number of target virtual items from the virtual item list of the virtual object.

The display module 1210 is further configured to display the user-customized number of target virtual items on the ground near the virtual object.

In an optional embodiment, the display module 1210 is further configured to display the at least one type of virtual items possessed by the virtual object and an initial drop region. The receiving module 1220 is further configured to receive a second drag operation, the second drag operation being used for dragging the target virtual items to the initial drop region. The processing module 1230 is further configured to display the first drop region and the second drop region when the target virtual items stay in the initial drop region longer than a time threshold.

In an optional embodiment, the processing module 1230 is further configured to control, when the target virtual items stay in the initial drop region less than the time threshold, the virtual object to drop all the target virtual items.

In an optional embodiment, the processing module 1230 is further configured to display the first drop region and the second drop region when the possession quantity of the target virtual items is greater than a quantity threshold.

In an optional embodiment, the display module 1210 is further configured to display the first drop region and the second drop region in response to that the possession quantity of the target virtual items is greater than the quantity threshold.

In an optional embodiment, the display module 1210 is further configured to: display a setting interface, and set the user-customized number according to a setting operation received by the setting interface.

Figure 13:
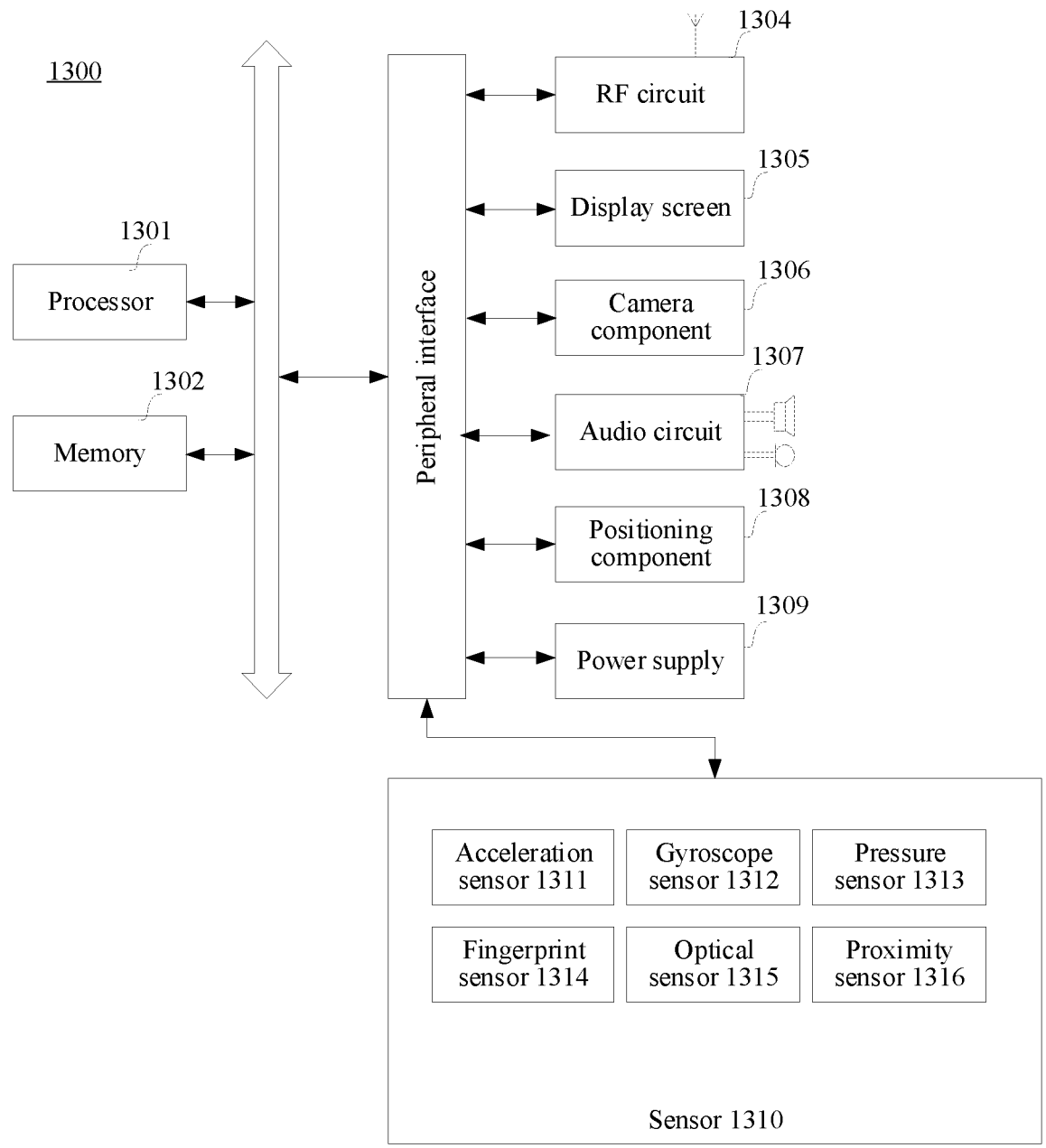
FIG. 13 is a structural diagram of an electronic device according to an exemplary embodiment of this application.

FIG. 13 is a structural block diagram of an electronic device 1300 according to an exemplary embodiment of this application. The electronic device 1300 may be a portable mobile terminal, for example, a smartphone, a tablet computer, a moving picture experts group audio layer III (MP3) player, or a moving picture experts group audio layer IV (MP4) player. The electronic device 1300 may be further referred to as other names such as user equipment and a portable terminal.

Generally, the electronic device 1300 includes a processor 1301 and a memory 1302.

The processor 1301 may include one or more processing cores, for example, a 4-core processor or an 8-core processor. The processor 1301 may be implemented in at least one hardware form of a digital signal processor (DSP), a field-programmable gate array (FPGA), and a programmable logic array (PLA). The processor 1301 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 1301 may be integrated with a graphics processing unit (GPU). The GPU is configured to render and draw content that needs to be displayed on a display screen. In some embodiments, the processor 1301 may further include an artificial intelligence (AI) processor. The AI processor is configured to process computing operations related to machine learning.

The memory 1302 may include one or more computer-readable storage media. The computer-readable storage medium may be tangible and non-transient. The memory 1302 may further include a high-speed random access memory and a nonvolatile memory, for example, one or more disk storage devices or flash storage devices. In some embodiments, the non-transient computer-readable storage medium in the memory 1302 is configured to store at least one instruction, and the at least one instruction is configured to be executed by the processor 1301 to implement the method for controlling a virtual object to drop a virtual item provided in this application.

In some embodiments, the electronic device 1300 may optionally include: a peripheral interface 1303 and at least one peripheral. Specifically, the peripheral includes: at least one of a radio frequency (RF) circuit 1304, a display screen 1305, a camera component 1306, an audio circuit 1307, a positioning component 1308, and a power supply 1309.

The peripheral interface 1303 may be configured to connect the at least one peripheral related to input/output (I/O) to the processor 1301 and the memory 1302. In some embodiments, the processor 1301, the memory 1302 and the peripheral interface 1303 are integrated on a same chip or circuit board. In some other embodiments, any one or two of the processor 1301, the memory 1302, and the peripheral interface 1303 may be implemented on a single chip or circuit board. This is not limited in this embodiment.

The RF circuit 1304 is configured to receive and transmit an RF signal, also referred to as an electromagnetic signal. The RF circuit 1304 communicates with a communication network and other communication devices through the electromagnetic signal. The RF circuit 1304 converts an electrical signal into an electromagnetic signal for transmission, or converts a received electromagnetic signal into an electrical signal. In some embodiments, the RF circuit 1304 includes: an antenna system, an RF transceiver, one or more amplifiers, a tuner, an oscillator, a digital signal processor, a codec chip set, a subscriber identity module card, and the like. The RF circuit 1304 may communicate with other terminals by using at least one wireless communication protocol. The wireless communication protocol includes, but is not limited to a world wide web, a metropolitan region network, an intranet, generations of mobile communication networks (2G, 3G, 4G, and 5G), a wireless local region network and/or a wireless fidelity (Wi-Fi) network. In some embodiments, the RF 1304 may further include a circuit related to NFC, which is not limited in this application.

The touch display screen 1305 is configured to display a user interface (UI). The UI may include a graph, text, an icon, a video, and any combination thereof. The touch display screen 1305 also has a capability of acquiring a touch signal on or above a surface of the touch display screen 1305. The touch signal may be inputted to the processor 1301 as a control signal for processing. The touch display screen 1305 is configured to provide a virtual button and/or a virtual keyboard, which is also referred to as a soft button and/or a soft keyboard. In some embodiments, there may be one display screen 1305, disposed on a front panel of the electronic device 1300. In some other embodiments, there may be at least two display screens 1305, respectively disposed on different surfaces of the electronic device 1300 or designed in a foldable shape. In still some other embodiments, the display screen 1305 may be a flexible display screen, disposed on a curved surface or a folded surface of the electronic device 1300. Even, the touch display screen 1305 may be further set in a non-rectangular irregular pattern, namely, a special-shaped screen. The touch display screen 1305 may be made of a material such as a liquid crystal display (LCD) or an organic light-emitting diode (OLED).

The camera component 1306 is configured to acquire images or videos. In some embodiments, the camera component 1306 includes a front-facing camera and a rear-facing camera. Generally, the front-facing camera is configured to implement a video call or self-portrait. The rear-facing camera is configured to capturing a picture or a video. In some embodiments, there are at least two rear-facing cameras, each of which is any one of a main camera, a depth of field camera and a wide-angle camera, to implement a background blurring function by fusing the main camera and the depth of field camera, and panoramic shooting and virtual reality (VR) shooting functions by fusing the main camera and the wide-angle camera. In some embodiments, the camera component 1306 may further include a flash. The flash may be a monochrome temperature flash, or may be a double color temperature flash. The double color temperature flash is a combination of a warm light flash and a cold light flash, and may be used for light compensation under different color temperatures.

The audio circuit 1307 is configured to provide an audio interface between a user and the electronic device 1300. The audio circuit 1307 may include a microphone and a speaker. The microphone is configured to collect sound waves of a user and an environment, and convert the sound waves into an electrical signal to input to the processor 1301 for processing, or input to the RF circuit 1304 for implementing voice communication. For the purpose of stereo sound collection or noise reduction, there may be a plurality of microphones, respectively disposed at different parts of the electronic device 1300. The microphone may be alternatively an array microphone or an omni-directional collection type microphone. The loudspeaker is configured to convert electric signals from the processor 1301 or the RF circuit 1304 into sound waves. The speaker may be a conventional film speaker, or may be a piezoelectric ceramic speaker. When the speaker is the piezoelectric ceramic speaker, the speaker not only can convert an electric signal into acoustic waves audible to a human being, but also can convert an electric signal into acoustic waves inaudible to a human being, for ranging and other purposes. In some embodiments, the audio circuit 1307 may also include an earphone jack.

The positioning component 1308 is configured to position a current geographic location of the electronic device 1300, to implement a navigation or a location based service (LBS). The positioning component 1308 may be a positioning component based on the global positioning system (GPS) of the United States, the BeiDou System of China, and the GALILEO System of Russia.

The power supply 1309 is configured to supply power to components in the electronic device 1300. The power supply 1309 may be an alternating current, a direct current, a disposable battery, or a rechargeable battery. When the power supply 1309 includes a rechargeable battery, and the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charging technology.

In some embodiments, the electronic device 1300 may also include one or more sensors 1310. The one or more sensors 1310 include, but are not limited to: an acceleration sensor 1311, a gyroscope sensor 1312, a pressure sensor 1313, a fingerprint sensor 1314, an optical sensor 1315, and a proximity sensor 1316.

The acceleration sensor 1311 may detect acceleration on three coordinate axes of a coordinate system established by the electronic device 1300. For example, the acceleration sensor 1311 may be configured to detect components of gravity acceleration on the three coordinate axes. The processor 1301 may control, according to a gravity acceleration signal acquired by the acceleration sensor 1311, the display screen 1305 to display the user interface in a frame view or a portrait view. The acceleration sensor 1311 may be further configured to acquire motion data of a game or a user.

The gyroscope sensor 1312 may detect a body direction and a rotation angle of the electronic device 1300. The gyroscope sensor 1312 may cooperate with the acceleration sensor 1311 to acquire a 3D action by the user on the electronic device 1300. The processor 1301 may implement the following functions according to the data acquired by the gyroscope sensor 1312: motion sensing (such as changing the UI according to a tilt operation of the user), image stabilization at shooting, game control, and inertial navigation.

The pressure sensor 1313 may be disposed on a side frame of the electronic device 1300 and/or a lower layer of the touch display screen 1305. When the pressure sensor 1313 is disposed at the side frame of the electronic device 1300, a holding signal of the user on the electronic device 1300 may be detected, and left/right hand identification and a quick action may be performed according to the holding signal. When the pressure sensor 1313 is disposed at the lower layer of the touch display screen 1305, an operable control on the UI interface can be controlled according to a pressure operation of the user on the touch display screen 1305. The operable control includes at least one of a button control, a scroll-bar control, an icon control, and a menu control.

The fingerprint sensor 1314 is configured to acquire a user's fingerprint to identify a user's identity according to the acquired fingerprint. When identifying that the user's identity is a trusted identity, the processor 1301 authorizes the user to perform related sensitive operations. The sensitive operations include: unlocking a screen, viewing encrypted information, downloading software, paying, changing a setting, and the like. The fingerprint sensor 1314 may be disposed on a front face, a back face, or a side face of the electronic device 1300. In a case that a physical button or a vendor logo is disposed on the electronic device 1300, the fingerprint sensor 1314 may be integrated together with the physical button or the vendor logo.

The optical sensor 1315 is configured to acquire ambient light intensity. In an embodiment, the processor 1301 may control the display brightness of the touch display screen 1305 according to the ambient light intensity acquired by the optical sensor 1315. Specifically, when the ambient light intensity is relatively high, the display brightness of the touch display screen 1305 is increased. When the ambient light intensity is relatively low, the display brightness of the touch display screen 1305 is decreased. In another embodiment, the processor 1301 may further dynamically adjust a camera parameter of the camera component 1306 according to the ambient light intensity acquired by the optical sensor 1315.

The proximity sensor 1316, also referred to as a distance sensor, is generally disposed on the front surface of the electronic device 1300. The proximity sensor 1316 is configured to acquire a distance between a front face of the user and the front face of the electronic device 1300. In an embodiment, in a case that the proximity sensor 1316 detects that the distance between the front face of the user and the front face of the electronic device 1300 is gradually decreased, the processor 1301 controls the touch display screen 1305 to switch from a screen-on state to a screen-off state. In a case that the proximity sensor 1316 detects that the distance between the front face of the user and the front face of the electronic device 1300 is gradually increased, the processor 1301 controls the touch display screen 1305 to switch from the screen-off state to the screen-on state.

A person skilled in the art may understand that the structure shown in FIG. 13 does not constitute a limitation to the electronic device 1300, and the electronic device may include more components or fewer components than those shown in the figure, or some components may be combined, or a different component deployment may be used.

According to another aspect of this application, a terminal is provided, and includes a processor and a memory, the memory storing at least one instruction, at least one program, a code set or an instruction set, the at least one instruction, the at least one program, the code set or the instruction set being loaded and executed by the processor to implement the method for controlling a virtual object to drop a virtual item according to the foregoing method embodiments.

This application further provides a computer-readable storage medium, storing at least one instruction, at least one program, a code set or an instruction set, the at least one instruction, the at least one program, the code set or the instruction set being loaded and executed by a processor to implement the method for controlling a virtual object to drop a virtual item according to the foregoing method embodiments.

"Plurality of" mentioned in the specification means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely preferred embodiments of this application, and are not intended to limit this application. Any modification, equivalent replacement, improvement and the like made within the spirit and principle of this application shall fall within the protection scope of this application.

What is claimed is:

1. A method for controlling a virtual object to drop a virtual item in a virtual environment performed at a terminal, the method comprising:
    displaying a user interface, the user interface including an icon corresponding to at least one type of a plurality of target virtual items possessed by a virtual object for playing a game in the virtual environment and a partial-drop region;
    receiving a first drag operation of dragging target virtual items from the icon corresponding to the at least one type of virtual items to the partial-drop region;
    dropping, among the plurality of target virtual items, a fixed number of target virtual items to the virtual environment in response to release of the first drag operation at a first location within the partial-drop region, wherein the fixed number is less than a total number of the plurality of target virtual items possessed by the virtual object; and
    dropping, among the plurality of target virtual items, a user-customized number of target virtual items to the virtual environment in response to release of the first drag operation at a second location within the partial-drop region, wherein the user-customized number is less than the total number of the plurality of target virtual items possessed by the virtual object, wherein the dropped target virtual items are configured to be picked up and used by a second virtual object for playing the game in the virtual environment.

2. The method according to claim 1, further comprising:
removing the fixed or the user-customized number of target virtual items from a virtual item list of the virtual object; and
displaying the fixed or the user-customized number of target virtual items on the ground near the virtual object.

3. The method according to claim 1, further comprising:
before the dropping operations:
determining a time duration of the target virtual items staying within the partial-drop region before the release of the first drag operation; and
dropping the fixed or the user-customized number of target virtual items when the time duration is longer than a time threshold.

4. The method according to claim 3, further comprising:
dropping the total number of the plurality of target virtual items when the time duration is less than the time threshold.

5. The method according to claim 1, further comprising:
before the dropping operations:
displaying the first location and the second location within the partial-drop region when the target virtual items possessed by the virtual object have a quantity greater than a quantity threshold.

6. The method according to claim 5, wherein the first location and the second location are displayed within the partial-drop region after the first drag operation is initiated on the icon.

7. The method according to claim 1, further comprising:
displaying a setting interface; and
setting the user-customized number according to a setting operation received by the setting interface.

8. A terminal, comprising: a processor and a memory, the memory storing at least one instruction, the at least one instruction, when executed by the processor, causing the terminal to perform a method for controlling a virtual object to drop a virtual item in a virtual environment, the method including:
displaying a user interface, the user interface including an icon corresponding to at least one type of a plurality of target virtual items possessed by a virtual object for playing a game in the virtual environment and a partial-drop region;
receiving a first drag operation of dragging target virtual items from the icon corresponding to the at least one type of virtual items to the partial-drop region;
dropping, among the plurality of target virtual items, a fixed number of target virtual items to the virtual environment in response to release of the first drag operation at a first location within the partial-drop region, wherein the fixed number is less than a total number of the plurality of target virtual items possessed by the virtual object; and
dropping, among the plurality of target virtual items, a user-customized number of target virtual items to the virtual environment in response to release of the first drag operation at a second location within the partial-drop region, wherein the user-customized number is less than the total number of the plurality of target virtual items possessed by the virtual object, wherein the dropped target virtual items are configured to be picked up and used by a second virtual object for playing the game in the virtual environment.

9. The terminal according to claim 8, wherein the method further comprises:
removing the fixed or the user-customized number of target virtual items from a virtual item list of the virtual object; and
displaying the fixed or the user-customized number of target virtual items on the ground near the virtual object.

10. The terminal according to claim 8, wherein the method further comprises:
before the dropping operations:
determining a time duration of the target virtual items staying within the partial-drop region before the release of the first drag operation; and
dropping the fixed or the user-customized number of target virtual items when the time duration is longer than a time threshold.

11. The terminal according to claim 10, wherein the method further comprises:
dropping the total number of the plurality of target virtual items when the time duration is less than the time threshold.

12. The terminal according to claim 8, wherein the method further comprises:
before the dropping operations:
displaying the first location and the second location within the partial-drop region when the target virtual items possessed by the virtual object have a quantity greater than a quantity threshold.

13. The terminal according to claim 12, wherein the first location and the second location are displayed within the partial-drop region after the first drag operation is initiated on the icon.

14. The terminal according to claim 8, wherein the method further comprises:
displaying a setting interface; and
setting the user-customized number according to a setting operation received by the setting interface.

15. A non-transitory computer-readable storage medium, storing at least one instruction, the at least one instruction, when executed by a processor of a terminal, causing the terminal to perform a method for controlling a virtual object to drop a virtual item in a virtual environment, the method including:
displaying a user interface, the user interface including an icon corresponding to at least one type of a plurality of target virtual items possessed by a virtual object for playing a game in the virtual environment and a partial-drop region;
receiving a first drag operation of dragging target virtual items from the icon corresponding to the at least one type of virtual items to the partial-drop region;
dropping, among the plurality of target virtual items, a fixed number of target virtual items to the virtual environment in response to release of the first drag operation at a first location within the partial-drop region, wherein the fixed number is less than a total number of the plurality of target virtual items possessed by the virtual object; and
dropping, among the plurality of target virtual items, a user-customized number of target virtual items to the virtual environment in response to release of the first drag operation at a second location within the partial-drop region, wherein the user-customized number is less than the total number of the plurality of target virtual items possessed by the virtual object, wherein the dropped target virtual items are configured to be picked up and used by a second virtual object for playing the game in the virtual environment.

16. The non-transitory computer-readable storage medium according to claim 15, wherein the method further comprises:
   removing the fixed or the user-customized number of target virtual items from a virtual item list of the virtual object; and
   displaying the fixed or the user-customized number of target virtual items on the ground near the virtual object.

17. The non-transitory computer-readable storage medium according to claim 15, wherein the method further comprises:
   before the dropping operations:
   determining a time duration of the target virtual items staying within the partial-drop region before the release of the first drag operation; and
   dropping the fixed or the user-customized number of target virtual items when the time duration is longer than a time threshold.

18. The non-transitory computer-readable storage medium according to claim 17, wherein the method further comprises:
   dropping the total number of the plurality of target virtual items when the time duration is less than the time threshold.

19. The non-transitory computer-readable storage medium according to claim 15, wherein the method further comprises:
   before the dropping operations:
   displaying the first location and the second location within the partial-drop region when the target virtual items possessed by the virtual object have a quantity greater than a quantity threshold.

20. The non-transitory computer-readable storage medium according to claim 15, wherein the method further comprises:
   displaying a setting interface; and
   setting the user-customized number according to a setting operation received by the setting interface.

* * * * *